US012452573B2

(12) United States Patent
Fu et al.

(10) Patent No.: US 12,452,573 B2
(45) Date of Patent: Oct. 21, 2025

(54) FIXING ASSEMBLIES AND WEARING DEVICES OF BONE CONDUCTION VIBRATORS

(71) Applicant: SHENZHEN SHOKZ CO., LTD., Guangdong (CN)

(72) Inventors: Junjiang Fu, Shenzhen (CN); Qianwen Nie, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 192 days.

(21) Appl. No.: 18/314,801

(22) Filed: May 9, 2023

(65) Prior Publication Data

US 2023/0283941 A1 Sep. 7, 2023

Related U.S. Application Data

(63) Continuation of application No. PCT/CN2022/097965, filed on Jun. 9, 2022.

(30) Foreign Application Priority Data

Aug. 11, 2021 (CN) ......................... 202110920437.7
Aug. 11, 2021 (CN) ......................... 202121881929.1
Aug. 11, 2021 (CN) ......................... 202121891007.9

(51) Int. Cl.
*H04R 1/10* (2006.01)

(52) U.S. Cl.
CPC ........... *H04R 1/105* (2013.01); *H04R 1/1075* (2013.01); *H04R 2460/13* (2013.01)

(58) Field of Classification Search
CPC .. H04R 1/105; H04R 1/1075; H04R 2460/13; H04R 25/606; H04R 1/02; H04R 1/10; H04R 11/02
See application file for complete search history.

(56) References Cited

U.S. PATENT DOCUMENTS 4,918,757 A 4/1990 Janssen et al.
2014/0064533 A1 3/2014 Kasic, II
(Continued)

FOREIGN PATENT DOCUMENTS

CN 104000571 A 8/2014
CN 106954152 A 7/2017
(Continued)

OTHER PUBLICATIONS

International Search Report in PCT/CN2022/097965 mailed on Sep. 20, 2022, 6 pages.
(Continued)

*Primary Examiner* — Brian Ensey
(74) *Attorney, Agent, or Firm* — METIS IP LLC

(57) ABSTRACT

The present disclosure provides a fixing assembly and a wearing device of a bone conduction vibrator, comprising: an elastic fixing portion, the elastic fixing portion being in a form of a band structure, the elastic fixing portion including a first position and a second position, the first position and the second position being disposed at intervals along a length direction of the elastic fixing portion; and a fixing member, configured to fix the elastic fixing portion around a wearing object, so that the bone conduction vibrator is located between the elastic fixing portion and the wearing object. When the elastic fixing portion surrounds the wearing object and is in a natural state, the fixing member fits into the first position of the elastic fixing portion; when the fixing member fits into the second position, the elastic fixing portion provides the bone conduction vibrator with a pressure acting on the wearing object, and the pressure is within a preset pressure range.

20 Claims, 9 Drawing Sheets

600

(56) References Cited

U.S. PATENT DOCUMENTS

| | | | | |
|---|---|---|---|---|
| 2016/0204646 | A1* | 7/2016 | Park | H02J 50/12 320/108 |
| 2017/0360162 | A1 | 12/2017 | Kawabata et al. | |
| 2018/0077505 | A1* | 3/2018 | Bern | H04R 25/606 |
| 2022/0313547 | A1 | 10/2022 | Takei | |

FOREIGN PATENT DOCUMENTS

| | | | |
|---|---|---|---|
| CN | 109215704 | A | 1/2019 |
| CN | 109260567 | A | 1/2019 |
| CN | 109496893 | A | 3/2019 |
| CN | 209915177 | U | 1/2020 |
| CN | 111694267 | A | 9/2020 |
| CN | 113057618 | A | 7/2021 |
| CN | 218162735 | U | 12/2022 |
| JP | 2016005024 | A | 1/2016 |
| JP | 6724078 | B2 | 7/2020 |

OTHER PUBLICATIONS

The Extended European Search Report in European Application No. 22855062.0 mailed on May 7, 2024, 9 pages.

Notice of Rejection in Japanese Application No. 2023-541584 mailed on Aug. 26, 2024, 12 pages.

Notice of Preliminary Rejection in Korean Application No. 10-2023-7023115 mailed on Jun. 13, 2024, 8 pages.

First Office Action in Chinese Application No. 202110920437.7 mailed on Aug. 15, 2025, 17 pages.

* cited by examiner

910

1400

FIXING ASSEMBLIES AND WEARING DEVICES OF BONE CONDUCTION VIBRATORS

CROSS-REFERENCE TO RELATED APPLICATIONS

This application is a continuation of International Patent Application No. PCT/CN2022/097965, filed on Jun. 9, 2022, which claims priority of Chinese Patent Application No. 202121891007.9, filed on Aug. 11, 2021, Chinese Patent Application No. 202110920437.7, filed on Aug. 11, 2021, and Chinese Patent Application No. 202121881929.1, filed on Aug. 11, 2021, the contents of each of which are entirely hereby incorporated by reference.

TECHNICAL FIELD

The present disclosure relates to the field of bone conduction vibrators, and in particular, to a fixing assembly and a wearing device of a bone conduction vibrator.

BACKGROUND

The bone conduction vibrator is connected to an audio signal source through a signal transmission member and converts an audio signal into a mechanical vibration that is transmitted to a wearing object to achieve transmission of the audio signal to the wearing object. During the process of transmitting vibration to the wearing object, the bone conduction vibrator needs to be in contact with the wearing object at all times to avoid interruption or error in the transmission process. If a pressure of the bone conduction vibrator in contact with the wearing object is too large, it may cause discomfort to the wearing object; if the pressure of the bone conduction vibrator in contact with the wearing object is too small, it may cause the signal transmission effect to be poor.

Therefore, it is desired to provide a fixing assembly of a bone conduction vibrator that is capable of keeping the bone conduction vibrator in contact with the wearing object and precisely adjusting the wearing pressure.

SUMMARY

One embodiment of the present disclosure provides a fixing assembly of a bone conduction vibrator, comprising: an elastic fixing portion, the elastic fixing portion being in a form of a band structure, the elastic fixing portion including a first position and a second position, the first position and the second position being disposed at intervals along a length direction of the elastic fixing portion; and a fixing member, configured to fix the elastic fixing portion around a wearing object, so that the bone conduction vibrator is located between the elastic fixing portion and the wearing object; wherein when the elastic fixing portion surrounds the wearing object and is in a natural state, the fixing member fits into the first position of the elastic fixing portion; when the fixing member fits into the second position, the elastic fixing portion provides the bone conduction vibrator with a pressure acting on the wearing object, and the pressure is within a preset pressure range.

In some embodiments, a product of a distance between the first position and the second position and an elastic coefficient of the elastic fixing portion is within the preset pressure range, the preset pressure range being 0.2 N-2 N.

In some embodiments, the elastic fixing portion is provided with multiple buckle holes disposed at intervals along the length direction thereof, the multiple buckle holes including at least one fixing buckle hole. The fixing buckle hole is located at the second position; the fixing member is a buckle member, the buckle member includes a buckle, and the buckle is inserted into the buckle hole so that the elastic fixing portion surrounds the wearing object.

In some embodiments, the multiple buckle holes are equally arranged along the length direction on the elastic fixing portion; the first position is located between two adjacent buckle holes, the fixing buckle hole is an m-th buckle hole from the first position, and when the buckle is inserted into the fixing buckle hole, the pressure is $F_0 \times (x_1/x_2+m-1)$, wherein $F_0 \times (x_1/x_2+m-1)$ is within the preset pressure range, $x_1$ denotes a distance between the first position and the 1st buckle hole at a side of the elastic fixing portion away from the fixing member relative to the first position, $x_2$ denotes a distance between two adjacent buckle holes, and $F_0$ denotes a tensioning force of the elastic fixing portion when a deformation of the elastic fixing portion is equal to a distance between two adjacent buckle holes.

In some embodiments, the multiple buckle holes are equally arranged along the length direction on the elastic fixing portion; the first position is located at a position of one of the multiple buckle holes, and the fixing buckle hole is the m-th buckle hole on a side away from the fixing member relative to the first position in an extension direction of the elastic fixing portion, and when the buckle is inserted into the fixing buckle hole, the pressure is $m \times F_0$, wherein $m \times F_0$ is within the preset pressure range and $F_0$ denotes a tensioning force of the elastic fixing portion when a deformation of the elastic fixing portion is equal to a distance between two adjacent buckle holes.

In some embodiments, $F_0$ is less than or equal to a maximum threshold of the preset pressure range.

In some embodiments, the elastic fixing portion includes a first band body and a second band body, wherein the first band body is used to at least partially elastically surround the head of the wearing object and the second band body is used to at least partially elastically surround a neck of the wearing object; wherein the fixing member is connected to the elastic fixing portion and fixes the bone conduction vibrator to the head of the wearing object.

In some embodiments, the first band body and the second band body are provided side by side, the elastic fixing portion further includes a connection portion, and the connection portion is used to connect the first band body and the second band body, wherein the connection portion is located in a central region along a length direction of the first band body or the second band body.

In some embodiments, the fixing member is provided on a side of the bone conduction vibrator away from the head of the wearing object, the fixing member is provided with a buckle column extending away from the bone conduction vibrator, and the first band body and the second band body are respectively provided with multiple first buckle holes and multiple second buckle holes disposed at intervals along their respective length directions for insertion of the buckle column.

In some embodiments, the multiple first buckle holes are symmetrically arranged on the first band body with the connection portion as the center, and the multiple second buckle holes are symmetrically arranged on the second band body with the connection portion as the center.

In some embodiments, the buckle column includes a first buckle column and a second buckle column disposed at intervals from each other along an interval direction of the first band body and the second band body, wherein the first buckle column is inserted into the first buckle hole and the second buckle column is inserted into the second buckle hole.

In some embodiments, the fixing member includes a buckle member, the elastic fixing portion includes a third band body, one end of the first band body and one end of the second band body being jointly connected to the third band body, the other end of the first band body and the other end of the second band body being jointly connected to the buckle member, the buckle member is further provided with a buckle column, and the third band body is provided with a plurality of buckle holes disposed at intervals along a length direction thereof for insertion of the buckle column.

In some embodiments, the fixing member is provided on a side of the bone conduction vibrator away from the head of the wearing object, the fixing member is provided with a first hook member and a second hook member extending away from the bone conduction vibrator, wherein the first hook member and the second hook member are disposed at intervals from each other in an interval direction of the first band body and the second band body, one end of the first hook member away from the fixing member extends toward the second hook member to form a free end of the first hook member, one end of the second hook member away from the fixing member extends toward the first hook member to form a free end of the second hook member, an opening is formed between the free end of the first hook member and the free end of the second hook member, and a size of the opening is less than a distance between the first band body and the second band.

In some embodiments, the elastic fixing portion includes a fixing connection portion, the fixing connection portion being connected to ends of the first band body and the second band body away from the third band body, the fixing connection portion including a fixing buckle hole, the buckle column of the buckle member being matched with the fixing buckle hole and the plurality of buckle holes.

In some embodiments, the first band body and the second band body are provided in an arc, and an arc length of the first band body is longer than an arc length of the second band body.

In some embodiments, the first band body and the second band body are set in concentric circular arcs.

In some embodiments, the bone conduction vibrator outputs an audio signal to the wearing object, and the wearing object detects feedback signals with different intensities. The pressure is within the preset pressure range and an intensity of any one of the feedback signals is greater than or equal to a preset signal intensity.

In some embodiments, the fixing assembly further includes a connection portion, the connection portion being provided on the bone conduction vibrator for connecting the bone conduction vibrator and the fixing assembly.

In some embodiments, the bone conduction vibrator includes a contact surface in direct or indirect contact with the wearing object, the pressure acting on the wearing object through the contact surface.

One embodiment of the present disclosure provides a wearing device a fixing assembly and a bone conduction vibrator, the fixing assembly being used to fix the bone conduction vibrator to a wearing object, the fixing assembly comprising: an elastic fixing portion, the elastic fixing portion being in a form of a band structure, the elastic fixing portion including a first position and a second position, the first position and the second position being disposed at intervals along a length direction of the elastic fixing portion; and a fixing member, configured to fix the elastic fixing portion around a wearing object, so that the bone conduction vibrator is located between the elastic fixing portion and the wearing object; wherein when the elastic fixing portion surrounds the wearing object and is in a natural state, the fixing member fits into the first position of the elastic fixing section; when the fixing member fits into the second position, the elastic fixing portion provides the bone conduction vibrator with a pressure acting on the wearing object, and the pressure is within a preset pressure range.

DETAILED DESCRIPTION

Figure 1:
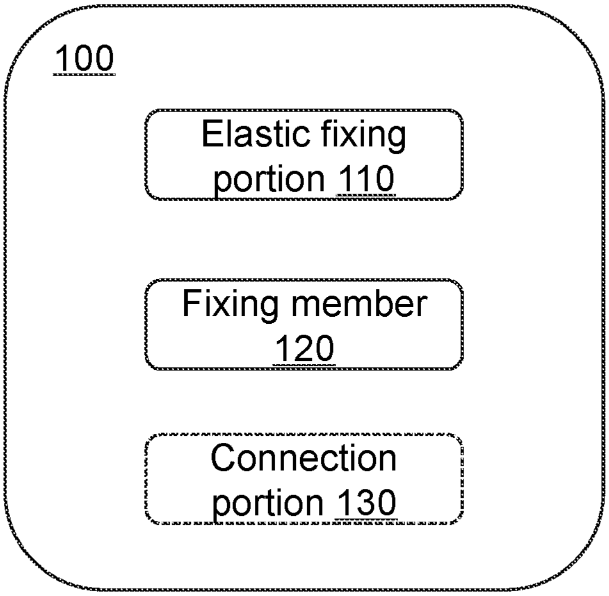
FIG. 1 is a block diagram illustrating a fixing assembly of an exemplary bone conduction vibrator according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system," "device," "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The words "first," "second," or the like, as used in the present disclosure and claims, do not indicate any order, number, or importance, but are used only to distinguish the different components. Similarly, the words "a" or "one" and similar words do not indicate a numerical limitation, but rather the presence of at least one. Unless otherwise noted, similar terms such as "front," "back," "bottom" and/or "top" are used are for illustrative purposes only, and are not limited to a location or a spatial orientation. In general, the terms "including" and "comprising" suggest only the inclusion of clearly identified steps and elements that do not constitute an exclusive list, and the method or apparatus may also contain other steps or elements.

Embodiments of the present disclosure describe a fixing assembly of a bone conduction vibrator. In some embodiments, the fixing assembly of the bone conduction vibrator may include an elastic fixing portion and a fixing member. The elastic fixing portion may be in a band structure. The fixing member may fix the elastic fixing portion around a wearing object so that the bone conduction vibrator is set between the elastic fixing portion and the wearing object, and the elastic fixing portion presses the bone conduction vibrator against the wearing object to achieve contact between the bone conduction vibrator and the wearing object, thereby ensuring that the bone conduction vibrator can output an audio signal (e.g., a bone conduction sound wave) to the wearing object by transmitting vibration to the wearing object. In some embodiments, the fixing member is fixed to a first end of the elastic fixing portion and is detachably fixed to a second end of the elastic fixing portion, and a position where the fixing member is detachably fixed to the second end of the elastic fixing portion is adjustable, so that a length of the elastic fixing portion worn around the wearing object is adjustable, and thus a pressure between the elastic fixing portion and the wearing object can be adjusted. For example, the fixing member is a buckle, the second end of the elastic fixing portion is provided with multiple buckle holes disposed at intervals along a length direction of the elastic fixing portion. The detachable fixing of the fixing member and the elastic fixing portion is realized by the cooperation of the buckle and the buckle holes. As another example, the fixing member is an adhesive buckle member including a gross surface and a hook surface. The detachable fixing of the fixing member and the elastic fixing portion is realized by the cooperation of the gross surface and the hook surface. As a further example, the fixing member is a ring buckle, and the second end of the elastic fixing portion is provided with multiple buckle slots disposed at intervals along the length direction thereof, and the detachable fixing of the fixing member and the elastic fixing portion is realized by the cooperation between the ring buckle and the buckle slots.

In some embodiments, the elastic fixing portion may include a first position and a second position on the second end. The first position and the second position are disposed at intervals along the length direction of the elastic fixing portion. When the fixing member fits into the first position of the elastic fixing portion, the elastic fixing portion surrounds the wearing object and is in a natural state. When the fixing member fits into the second position, the elastic fixing portion provides the bone conduction vibrator with appropriate pressure on the wearing object. The pressure is within a preset pressure range so as to make the wearing object more comfortable while receiving an audio signal effectively. In some embodiments, a product of a distance between the first position and the second position and an elastic coefficient of the elastic fixing portion is within the preset pressure range, and the matching position of the fixing member and the elastic fixing portion may be adjusted between the first position and the second position so that the pressure provided by the elastic fixing portion for the bone conduction vibrator is always within the preset pressure range.

In some embodiments, the fixing assembly may be used for bone conduction vibrator testing. Specifically, when conducting a bone conduction vibrator test, the bone conduction vibrator may be fixed to the wearing object (e.g., a human body, a guinea pig, etc.) by the fixing assembly. The bone conduction vibrator outputs an audio signal to the wearing object, and a feedback signal generated by the wearing object in response to the audio signal output by the bone conduction vibrator may be detected. The signal transmission performance of the bone conduction vibrator may be judged by the feedback signal. In some embodiments, when an intensity of the detected feedback signal is greater than or equal to a preset signal intensity, it can be considered that the audio signal transmission performance of the bone conduction vibrator is relatively good, and can make the wearing object effectively obtain information contained in the audio signal after receiving the audio signal. In some embodiments, a pressure between the wearing object and the bone conduction vibrator or the fixing assembly may be detected. A pressure set including intensities of the feedback signals is greater than or equal to the preset signal intensity is taken as a preset pressure range.

In some embodiments, the fixing assembly may also be used for the wearing of an acoustic output device. Specifically, the acoustic output device may include a bone conduction vibrator. During the activity of the wearing object, the fixing assembly may maintain the acoustic output device in relative fixation and/or contact with the head of the wearing object at all times, so that an audio signal output by the acoustic output device may be transmitted to the wearing object and be perceived by the auditory nerves of the human body. In some embodiments, the fixing assembly may also be used for the wearing of other devices (e.g., an electronic device). For example, the fixing assembly may be used for the wearing of a watch, an oximeter, a blood pressure monitor, a pedometer, and other devices.

FIG. 1 is a block diagram illustrating a fixing assembly of an exemplary bone conduction vibrator according to some embodiments of the present disclosure. As shown in FIG. 1, the fixing assembly 100 of the bone conduction vibrator may include an elastic fixing portion 110 and a fixing member 120. The elastic fixing portion 110 is a structure with elasticity made of an elastic material. The elastic fixing portion 110 has a tensioning force due to its elasticity, thereby providing a pressure for the bone conduction vibrator to act on the wearing object, wherein the tensioning force of the elastic fixing portion 110 may be approximated as a pressure of the bone conduction vibrator acting on the wearing object. In some embodiments, a pressure of the bone conduction vibrator acting on the wearing object may be determined by determining the tensioning force of the elastic fixing portion 110. The tensioning force (the pressure of the bone conduction vibrator acting on the wearing object) of the elastic fixing portion 110 is calculated by the following equation:

$$F=k\times x \tag{1}$$

where F denotes the pressure of the bone conduction vibrator acting on the wearing object; k denotes an elastic coefficient of the elastic fixing portion 110, and x denotes the deformation generated by the elastic fixing portion 110.

The elastic coefficient of the elastic fixing portion 110 is related to a thickness, a length, a width, a shape, and a material of the elastic fixing portion 110. In some embodiments, the elastic coefficient of the elastic fixing portion 110 may be adjusted by adjusting any one or more of the thickness, length, width, shape, and material of the elastic fixing portion 110 to achieve adjustment of the pressure of the bone conduction vibrator acting on the wearing object.

In some embodiments, the thickness of the elastic fixing portion 110 may be in a range of 0.6 mm-2 mm. In some embodiments, the thickness of the elastic fixing portion 110 may be in the range of 0.7 mm-1.5 mm. In some embodiments, the thickness of the elastic fixing portion 110 may be in the range of 0.8 mm-1.2 mm. In some embodiments, the thickness of the elastic fixing portion 110 may be in the range of 0.9 mm-1.0 mm. In some embodiments, the thickness of the elastic fixing portion 110 is 0.8 mm, 1.1 mm, or 1.2 mm, etc. Preferably, the thickness of the elastic fixing portion 110 may be 1.2 mm. It should be noted that the thickness of the elastic fixing portion 110 may also be other thicknesses (e.g., less than 0.6 mm or greater than 2 mm), which is not specifically limited by the present disclosure.

In some embodiments, the elastic material of the elastic fixing portion 110 may include a silicone material. In some embodiments, the silicone material may include, but is not limited to, any one or more of: a 10 degree silicone 50% high tensile silicone material, a 20 degree silicone 50% high tensile silicone material, a 30 degree silicone 50% high tensile silicone material, a 10 degree silicone 70% high tensile silicone material, a 20 degree silicone 70% high tensile silicone material, a 30 degree silicone 70% high tensile silicone material, a 10 degree silicone 1% high tensile silicone material, a 20 degree silicone 1% high tensile silicone material or a 30 degree silicone 1% high tensile silicone material. It should be noted that in other embodiments of the present disclosure, the elastic fixing portion 110 may also be made of other materials, such as polycarbonate, polyamide, rubber, etc., and is not specifically limited herein.

The elastic coefficients with respect to different (e.g., different thicknesses and/or materials) elastic fixing portions 110 may be obtained by pretesting, and the testing method may be performed as follows including: obtaining an elastic band of the same material, thickness, and width as the elastic fixing portion 110, applying a preset value of tensile force to the elastic band by a tensiometer to deform the elastic band, measuring the deformation of the elastic band, and calculating the elastic coefficient k according to equation (1), i.e., the elastic coefficient k is equal to the preset value of tensile force divided by the deformation of the elastic band.

In some embodiments, the elastic fixing portion 110 may be a band structure. A first position and a second position are disposed at intervals along the length direction thereof on the elastic fixing portion 110, and the first position and the second position of the elastic fixing portion 110 may be matched with the fixing member 120 so as to adjust the elastic fixing portion to provide the bone conduction vibrator with a pressure acting on the wearing object. For example, the elastic fixing portion 110 surrounds a particular part (e.g., a head) of the wearing object, wherein when the fixing member 120 fits into the first position of the elastic fixing portion 110, the elastic fixing portion 110 is in a natural state. As another example, when the fixing member 120 fits into the second position, the elastic fixing portion 110 provides a pressure to the bone conduction vibrator that acts on the wearing object and the pressure is within a preset pressure range. The natural state may be understood that the fixing assembly 100 may surround a particular part of the wearing object, and the bone conduction vibrator provides a pressure acting on the wearing object that is less than a particular pressure (e.g., 0.2 N). In some embodiments, the elastic fixing portion 110 may include a band body that may be surrounded and fixed around the wearing object under the action of the fixing member 120. For more information about the band body, please refer to FIG. 2, FIG. 3 and related descriptions. In some embodiments, the elastic fixing portion 110 may include a first band body and a second band body. The first band body and the second band body may surround and fix respectively at different parts of the wearing object under the action of the fixing member 120. For more information about the first band body and the second band body, please refer to FIG. 6 and related descriptions.

The fixing member 120 is configured to fix the elastic fixing portion 110 round the wearing object. A matching position between the fixing member 120 and the elastic fixing portion 110 may be adjusted between the first position and the second position of the elastic fixing portion 110, which may allow the elastic fixing portion 110 to provide a pressure to the bone conduction vibrator that is always within the preset pressure range. In some embodiments, the preset pressure range is 0.2N-2N. In some embodiments, the preset pressure range may be 0.5N-2N. Preferably, the preset pressure range may be 0.8N-2N. More preferably, the preset pressure range may be 1.2N-1.8N.

In some embodiments, the fixing member 120 may be a buckle, and the buckle cooperates with one or more buckle holes on the elastic fixing portion 110 to achieve detachable fixing between the fixing member 120 and the elastic fixing portion 110. The first position may be a position of a buckle hole or any other position on the elastic fixing portion 110 (e.g., between buckle holes), and the second position may be a position of a buckle hole with a certain distance from the first position. The position of the buckle hole that fits with the buckle may be adjusted to adjust a tension degree of the elastic fixing portion 110 around the wearing object, thereby enabling adjustment of the magnitude of the pressure applied to the wearing object by the bone conduction vibrator located between the elastic fixing portion 110 and the wearing object. For more information about the buckle and buckle holes, please refer to FIG. 3 and related descriptions. In some embodiments, the fixing member 120 is an adhesive buckle member. The fixing member 120 may include a gross surface structure. One side of the gross surface structure is connected to one end of the elastic fixing portion 110. The elastic fixing portion 110 includes multiple hook surfaces disposed at intervals along the length direction of the elastic fixing portion 110. The hook surfaces are located at one end of the elastic fixing portion 110 away from the gross surface structure. The gross side of the gross surface structure may respectively cooperate with the multiple hook surfaces disposed at intervals on the elastic fixing portion 110 to achieve detachable fixing between the two ends of the elastic fixing portion 110. The first position may be a position of a certain hook surface or any other position on the elastic fixing portion 110 (for example, a position between hook surfaces), and the second position may be a position of a hook surface at a certain distance from the first position. The position of the hook surface located at one end that cooperates with the gross surface located at another end may be adjusted to adjust a tension degree of the elastic fixing portion 110 around the wearing object, thereby enabling adjustment of the magnitude of the pressure applied to the wearing object by the bone conduction vibrator located between the elastic fixing portion 110 and the wearing object. For more information about the gross surface and the hook surface, please refer to FIG. 4 and related descriptions. In some embodiments, the fixing member 120 may be a ring buckle, and the ring buckle cooperates with a slot on the elastic fixing portion 110 to achieve the detachable fixing between the fixing member 120 and the elastic fixing portion 110. The first position may be a position of a certain slot or any other position on the elastic fixing portion 110 (e.g., a position between slots), and the second position may be a position of a slot at a certain distance from the first position. The position of the slot that cooperates with the ring buckle may be adjusted to adjust a tension degree of the elastic fixing portion 110 around the wearing object, thereby enabling adjustment of the magnitude of the pressure applied to the wearing object by the bone conduction vibrator located between the elastic fixing portion 110 and the wearing object. For more information about the ring buckle and the slot, please refer to FIG. 5A, FIG. 5B, and the related descriptions.

The bone conduction vibrator is located between the elastic fixing portion 110 and the wearing object, and the bone conduction vibrator contacts the wearing object with a certain pressure under the action of the elastic fixing portion 110. In some embodiments, the bone conduction vibrator may include a contact surface that directly or indirectly contacts the wearing object, and the pressure acts on the wearing object via the contact surface. An audio signal output from the bone conduction vibrator is also transmitted via the contact surface to the wearing object.

In some embodiments, the fixing assembly 100 may further include a connection portion 130 for connecting the bone conduction vibrator to the fixing assembly 100. In some embodiments, the connection portion 130 may be located at a side of the elastic fixing portion 110 near the wearing object, and the connection portion 130 may be used to connect the bone conduction vibrator so that the bone conduction vibrator is located between the elastic fixing portion 110 and the wearing object. In some embodiments, the connection portion 130 may also be provided on the bone conduction vibrator for connecting the bone conduction vibrator to the fixing assembly 100. In some embodiments, the connection portion 130 may be provided at a side of the bone conduction vibrator away from the wearing object, or at a side surface of the bone conduction vibrator that is perpendicular to the wearing object. In some embodiments, the connection portion 130 may be a fixing base, which is provided on the bone conduction vibrator or the elastic fixing portion 110. For example, one side of the fixing base is connected to the elastic fixing portion 110, and the other side of the fixing base is connected to the side of the bone conduction vibrator away from the wearing object or to the side surface of the bone conduction vibrator that is perpendicular to the wearing object. In some embodiments, the connection portion 130 may also be a glue-cured structure. For example, by applying the glue to the elastic fixing portion 110 and/or the bone conduction vibrator, the glue may be used to fix the fixing member 120 to the side of the bone conduction vibrator that is away from the wearing object.

Figure 2:
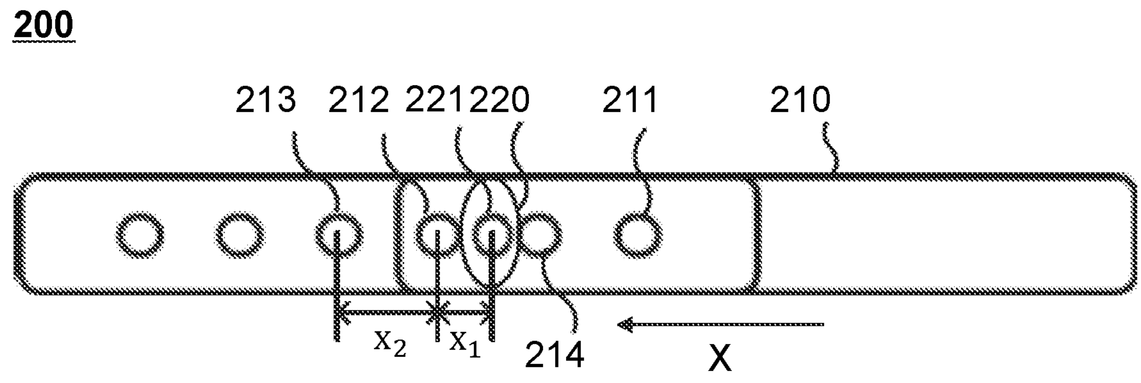
FIG. 2 is a schematic diagram illustrating a structure of a fixing assembly according to some embodiments of the present disclosure.
Figure 3:
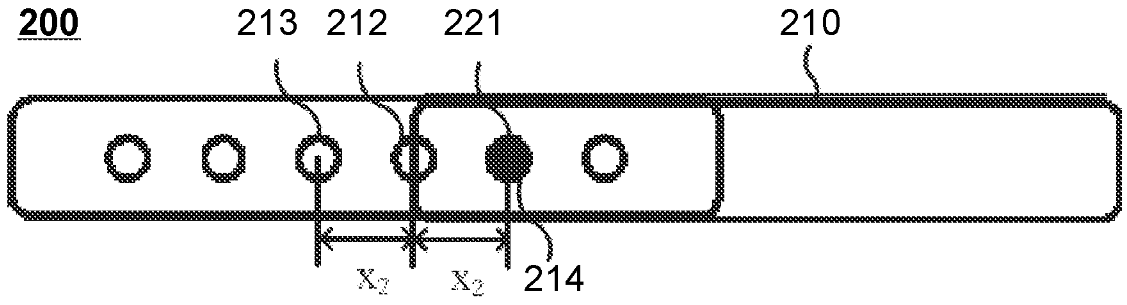
FIG. 3 is a schematic diagram illustrating a structure of a fixing assembly according to some further embodiments of the present disclosure.

The fixing assembly is illustrated exemplarily below in conjunction with FIGS. 2 and 3. FIG. 2 is a schematic diagram illustrating a structure of a fixing assembly according to some embodiments of the present disclosure. FIG. 3 is a schematic diagram illustrating a structure of a fixing assembly according to some further embodiments of the present disclosure. As shown in FIG. 2 and FIG. 3, in some embodiments, a fixing assembly 200 may include an elastic fixing portion 210 and a fixing member 220. In some embodiments, the elastic fixing portion 210 may be a band structure, and the elastic fixing portion 210 is provided with multiple buckle holes 211 disposed at intervals along the length direction (X direction shown in FIG. 2) of the band structure. Correspondingly, the fixing member 220 may be a buckle member, and the fixing member 220 may include a buckle 221. The buckle 221 is fixed to one end of the elastic fixing portion 210. The fixing member 220 and the other end of the elastic fixing portion 210 are detachably fixed by inserting the buckle 221 into the buckle holes 211. By adjusting the buckle 221 into the buckle holes 211 at different positions, the tension degree of the elastic fixing portion 210 around the wearing object may be adjusted, so as to achieve the adjustment of the pressure of the bone conduction vibrator located between the elastic fixing portion 210 and the wearing object acting on the wearing object. Specifically, the closer the buckle 221 buckles into the buckle holes 211 to one end of the elastic fixing portion 210 away from the fixing member 220, the smaller the pressure. It should be understood that one end of the elastic fixing portion 210 and the other end of the elastic fixing portion 210 of this embodiment may be the opposite ends of the band structure or may refer to the opposite ends after truncating the circular elastic fixing portion 210 from a certain position.

In some embodiments, the elastic fixing portion 210 is a rubber band with elasticity. In some embodiments, the multiple buckle holes 211 provided on the elastic fixing portion 210 away from one end of the fixing member 220 are equally arranged. By cooperating the buckle 221 with the buckle holes 211 at different positions, the wearing pressure can be precisely adjusted. In some embodiments, the buckle 221 may include a base, a mushroom head-like structure, and a connection column, wherein the mushroom head-like structure is connected to the base via the connection column. In some embodiments, the mushroom head-shaped structure may be a hemisphere, wherein a diameter of the hemisphere is larger than a diameter of the buckle hole 211, and the elastic fixing portion 210 is a structure with elasticity, so that the mushroom head-shaped structure may be passed through the buckle hole 211 by an external force, so that when the buckle 221 is inserted into the buckle holes 211, the buckle hole 211 cooperates with the connection column, and the mushroom head-shaped structure and the base play a limiting role, thereby preventing the elastic fixing portion 210 from detaching from the buckle 221. Merely by way of example, the diameter of the buckle hole 211 may be 3 mm and the diameter of the mushroom head may be 4 mm. It should be understood that the shape and size of the buckle 221 may be varied according to actual needs, for example, the diameter of the hemisphere may be other sizes; alternatively, the buckle 221 may also be a structure such as a hook with one end in the shape of a hook.

In some embodiments, the elastic fixing portion 210 may include a first position and a second position in sequence along the length direction of the elastic fixing portion 210. The first position is a position where the fixing member 220 is connected to the elastic fixing portion 210 when the elastic fixing portion 210 surrounds a test wearing object and is in its natural state, and the second position is a position where the fixing member 220 is connected to the elastic fixing portion 210 when the elastic fixing portion 210 surrounds the test wearing object and provides a pressure within a preset pressure range for the bone conduction vibrator to act on the test wearing object.

In some embodiments, the multiple buckle holes 211 may include at least one fixing buckle hole, and a position where the fixing buckle hole is located is the second position. When the buckle 221 is buckled into the fixing buckle hole, the elastic fixing portion 210 can be worn around the wearing object and the fixing member 220 can be fixed at the second position. The second position may be any position on the elastic fixing portion 210, which only needs to meet: a product of a distance between the second position and the first position, and the elastic coefficient k of the elastic fixing portion 210 is between a minimum threshold of the pressure of the bone conduction vibrator on the wearing object and a maximum threshold of the pressure of the bone conduction vibrator on the wearing object. Thus, a count of the second positions may be one or more. When there are multiple fixing buckle holes, the count of the second positions is also multiple, and each position where the fixing buckle hole is located is one second position, i.e., the product of the distance between each fixing buckle hole and the first position and the elastic coefficient of the elastic fixing portion 210 is between the minimum threshold of the tensioning force and the maximum threshold of the tensioning force.

In some embodiments, a distance between two adjacent buckle holes 211 of the multiple buckle holes 211 is $x_2$. That is, when the buckle 221 is moved out from one buckle hole 211 and buckles into another buckle hole 211 adjacent to that buckle hole 211, an increment of the tensioning force of the elastic fixing portion 210 is $F_0=k\times x_2$. By adjusting the magnitude of the elastic coefficient k of the elastic fixing portion 210 and the distance $x_2$ between the two adjacent buckle holes 211, the increment of the tensioning force $F_0$ when the deformation of the elastic fixing section 210 is increased to $x_2$ may be adjusted. By adjusting the position of the buckle hole 211 where the buckle 221 is inserted, the deformation of the elastic fixing portion 210 may be adjusted, and a product of the deformation of the elastic fixing portion 210 and the elastic coefficient of the elastic fixing portion 210 is the magnitude of the tensioning force of the elastic fixing portion 210. Therefore, according to the position of the buckle hole 211 where the buckle 221 is inserted, it is easy to determine the magnitude of the tensioning force of the elastic fixing portion 210, thereby determining the magnitude of the pressure of the bone conduction vibrator on the wearing object without the use of a measuring instrument, etc., and simplifying the operation steps for bone conduction testing. Moreover, by adjusting the position of the buckle hole 211 where the buckle 221 is inserted, the pressure of the bone conduction vibrator on the wearing object may be adjusted easily and precisely so as to ensure that the pressure of the bone conduction vibrator on the wearing object is within the preset pressure range (i.e., between a minimum pressure threshold and a maximum pressure threshold).

By way of exemplary illustration only, the multiple buckle holes 211 may include a first buckle hole 212, a second buckle hole 213, and a third buckle hole 214. The third buckle hole 214, the first buckle hole 212, and the second buckle hole 213 are provided adjacent to each other and are arranged sequentially along a direction of the elastic fixing portion 210 away from the fixing member 220. The direction (X-direction shown in FIG. 2) of the elastic fixing portion 210 away from the fixing member 220 refers to a direction along the length direction of the elastic fixing portion 210 from one end where the fixing member 220 is located to one end where the buckle hole 211 is located. A distance between adjacent buckle holes 211 is $x_2$, i.e., the distance between the third buckle hole 214 and the first buckle hole 212 and the distance between the second buckle hole 213 and the first buckle hole 212 are $x_2$. When the deformation of the elastic fixing portion 210 increases by each $x_2$, the tensioning force of the elastic fixing portion 210 increases by $F_0$.

As shown in FIG. 2, in some embodiments, the first position may be located between any two adjacent buckle holes 211, the fixing buckle hole (i.e., the second position) is the m-th buckle hole 211 from the first position. When the buckle 221 is inserted into the fixing buckle hole, the pressure is denoted as $F_0\times(x_1/x_2+m-1)$, wherein $F_0\times(x_1/x_2+m-1)$ is within the preset pressure range, $x_1$ denotes a distance between the 1st buckle hole at a side away from the fixing member 210 along a direction in which the elastic fixing portion 210 is away from the fixing member 220 and the first position, $x_2$ denotes the distance between two adjacent buckle holes 211, and $F_0$ denotes the tensioning force of the elastic fixing portion 210 when the deformation of the elastic fixing portion 210 is equal to the distance between two adjacent buckle holes 211.

Specifically, as shown in FIG. 2, the first position is located between the third buckle hole 214 and the first buckle hole 212, and when the buckle 221 inserts into the first buckle hole 212, the deformation of the elastic fixing portion 210 is denoted as $x=x_1$ and the pressure of the bone conduction vibrator on the wearing object is denoted as $F=k\times x_1=F_0\times(x_1/x_2)$. When the buckle 221 is inserted into the second buckle hole 213, the deformation of the elastic fixing portion 210 is denoted as $x=x_1+x_2$, and the pressure of the bone conduction vibrator on the wearing object may be determined as $F=F_0\times(x_1/x_2+1)$; when the buckle 221 inserts into the n-th buckle hole 211 on a side of the first position away from the side of the fixing member 220 along the direction in which the elastic fixing portion 210 is away from the fixing member 220, the pressure of the bone conduction vibrator on the wearing object is denoted as $F=F_0\times(x_1/x_2+n-1)$. n is a natural number greater than 0. When the buckle 221 is inserted into different buckle holes 211, since the pressure of the bone conduction vibrator on the wearing object can be determined according to the equation: $F=F_0\times(x_1/x_2+n-1)$, it is not necessary to know the pressure of the bone conduction vibrator on the wearing object by other testing methods, thereby simplifying the operation steps of bone conduction vibrator testing. Moreover, by adjusting the position of the fixing buckle hole, the pressure of the bone conduction vibrator on the wearing object may be easily and precisely adjusted, and it is possible to ensure that the pressure of the bone conduction vibrator on the wearing object is within the preset pressure range. Herein, the fixing buckle hole is the m-th buckle hole 211 on the side of the first position away from the fixing member 220 along the direction in which the elastic fixing portion 210 is away from the fixing member 220. When the buckle 221 is inserted into the fixing buckle hole, the pressure of the bone conduction vibrator on the wearing object is $m\times F_0$, where $m\times F_0$ is within the preset pressure range, m is also a natural number greater than 0, and m denotes several specific natural numbers among the natural numbers referred to by n. It should be noted that the fixing buckle holes may be some specific buckle holes among the multiple buckle holes 211, and when the buckle 221 is inserted into the fixing buckle hole, the pressure of the bone conduction vibrator on the wearing object is within the preset pressure range.

Merely by way of example, the preset pressure range of the bone conduction vibrator on the wearing object is 0.6N-1.2N, i.e., the minimum pressure threshold of the bone conduction vibrator on the wearing object is 0.6N and the maximum pressure threshold of the bone conduction vibrator on the wearing object is 1.2N. $F_0$ is 0.6N, i.e., when the deformation of the elastic fixing portion 210 is the same as the distance between the adjacent buckle holes 211, the variation of the tensioning force of the elastic fixing portion 210 is 0.6N. When the buckle 221 is inserted into the second buckle hole 213 as shown in FIG. 2, the tensioning force of the elastic fixing portion 210 is $0.6\times(x_1/x_2+1)$, which is within the preset pressure range of 0.6N-1.2N. In this case, n=2, i.e., the 2nd buckle hole 211 on the side of the first position away from the fixing member 220 along the direction in which the elastic fixing portion 210 is away from the fixing member 220 is the fixing buckle hole.

When adjusting the value of the distance $x_2$ between two adjacent buckle holes 211, and/or adjusting the value of the elastic coefficient k of the elastic fixing portion 210, the value of $F_0$ may be changed, and the position of the fixing buckle hole may be changed accordingly. For example, the value of $F_0$ is adjusted to 0.3N. At this time, the tensioning force of the elastic fixing portion 210 is $0.3\times(x_1/x_2+n-1)$, and when n is 3 or 4, the tensioning force of the elastic fixing portion 210 is within the threshold range of 0.6N-1.2N. In some embodiments, m may be 3 or 4, i.e., the 3rd buckle hole 211 and the 4th buckle hole 211 on the side of the first position away from the fixing member 220 along the direction in which the elastic fixing portion 210 is away from the fixing member 220 are fixing buckle holes. When the buckle 221 is inserted into the 3rd buckle hole 211 or the 4th buckle hole 211, it can ensure that the tensioning force of the elastic fixing portion 210 is within the threshold range, thus ensuring that the pressure of the bone conduction vibrator on the wearing object is within the preset pressure range. Moreover, when the buckle 221 is inserted into the 3rd buckle hole 211, it is easy to know that the tensioning force of the elastic fixing portion 210 is 0.6N-0.9N; when the buckle 221 is inserted into the 4th buckle hole 211, it is easy to know that the tensioning force of the elastic fixing portion 210 is 0.9N-1.2N.

In some embodiments, the first position may be located at a position of any one of the buckle holes 211. The fixing buckle hole is the m-th buckle hole 211 on the side of the first position away from the fixing member 220 along the direction in which the elastic fixing portion 210 is away from the fixing member 220. When the buckle 221 is inserted into the fixing buckle hole, the pressure of the bone conduction vibrator on the wearing object is $m\times F_0$, where $m\times F_0$ is within the preset pressure range.

Specifically, as shown in FIG. 3, the elastic fixing portion 210 surrounds the wearing object. When the elastic fixing portion 210 is in its natural state, the buckle 221 corresponds to the position of the third buckle hole 214. That is, in this embodiment, the first position of the elastic fixing portion 210 is a position where the third buckle hole 214 is located. When the buckle 221 is inserted into the first hole 212, it is known that the pressure of the bone conduction vibrator on the wearing object is $F=k\times x_2=F_0$; when the buckle 221 is inserted into the second hole 213, it is known that the pressure of the bone conduction vibrator on the wearing object is $F=k\times 2x_2=2F_0$; when the buckle 221 is inserted into the n-th buckle hole 211 on the side of the first position away from the fixing member 220 along the direction in which the elastic fixing portion 210 is away from the fixing member 220, the pressure of the bone conduction vibrator on the wearing object is $F=nF_0$. When the buckle 221 is inserted into different buckle holes 211, since the pressure of the bone conduction vibrator on the wearing object can be determined according to the equation: $F=nF_0$, it is not necessary to know the pressure of the bone conduction vibrator on the wearing object by other testing methods, thereby simplifying the operation steps of bone conduction vibrator testing. Moreover, by adjusting the position of the fixing buckle hole, the pressure of the bone conduction vibrator on the wearing object may be easily and precisely adjusted, and it is possible to ensure that the pressure of the bone conduction vibrator on the wearing object is within the preset pressure range.

Merely by way of example, the threshold range of the pressure of the bone conduction vibrator on the wearing object is 0.6N-1.2N, i.e., a minimum threshold of the pressure of the bone conduction vibrator on the wearing object is 0.6N, and a maximum threshold of the pressure of the bone conduction vibrator on the wearing object is 1.2N. $F_0$ is 0.6N, i.e., when the deformation of the elastic fixing portion 210 is the same as the distance between the adjacent buckle holes 211, the variation of the tensioning force of the elastic fixing portion 210 is 0.6N. In the embodiment shown in FIG. 3, the buckle 221 may be selected to be inserted into the 1st buckle hole 211 or the 2nd buckle hole 211 on the side of the first position away from the fixing member 220 along the direction in which the elastic fixing portion 210 is away from the fixing member 220. When the buckle 221 is inserted in the 1st buckle hole 211 on the side of the first position away from the fixing member 220 along the direction in which the elastic fixing portion 210 is away from the fixing member 220, the tensioning force of the elastic fixing portion 210 is 0.6N; when the buckle 221 is inserted into the 2nd buckle hole 211 on the side of the first position away from the fixing member 220 along the direction in which the elastic fixing portion 210 is away from the fixing member 220, the tensioning force of the elastic fixing portion 210 is 1.2N, thus ensuring that the tensioning force of the elastic fixing portion 210 is within the threshold range of 0.6N-1.2N. In this implementation, m may be 1 or 2, i.e., both the 1st buckle hole 211 and the 2nd buckle hole 211 on the side of the first position away from the fixing member 220 along the direction in which the elastic fixing portion 210 is away from the fixing member 220 are the fixing buckle holes in this embodiment.

When adjusting the distance $x_2$ between two adjacent buckle holes 211, and/or adjusting the elastic coefficient k of the elastic fixing portion 210, the value of $F_0$ may be changed, and the position of the fixing buckle hole may be changed accordingly. For example, the value of $F_0$ is adjusted to 0.3N. At this time, the tensioning force of the elastic fixing portion 210 is 0.3 n, and when n is 2, 3, or 4, the tensioning force of the elastic fixing portion 210 is within the threshold range 0.6N-1.2N. At this time, m may be equal to 2, 3, or 4, i.e., the 2nd buckle hole 211, the 3rd buckle hole 211, and the 4th buckle hole 211 on the side of the first position away from the fixing member 220 along the direction in which the elastic fixing portion 210 is away from the fixing member 220 are all fixing buckle holes in this embodiment. When the buckle 221 is inserted into the 2nd buckle hole 211, the 3rd buckle hole 211, and the 4th buckle hole 211 on the side of the first position away from the fixing member 220 along the direction in which the elastic fixing portion 210 is away from the fixing member 220, the tensioning force of the elastic fixing portion 210 can be ensured to be within the threshold value, thereby ensuring that the pressure of the bone conduction vibrator on the wearing object is within the preset pressure range. Moreover, when the buckle 221 is inserted into the 2nd buckle hole 211, it is easy to know that the tensioning force of the elastic fixing portion 210 is 0.6N; when the buckle 221 is inserted into the 3rd buckle hole 211, it is easy to know that the tensioning force of the elastic fixing portion 210 is 0.9N; when the buckle 221 is inserted into the 4th buckle hole 211, it is easy to know that the tensioning force of the elastic fixing portion 210 is 1.2N.

It should be noted that a distance between buckle holes 211 may be a distance between centers of the buckle holes 211. A distance between a buckle hole 211 and the first position may be a distance from the center of the buckle hole 211 to a central axis of the buckle 221 when the elastic fixing portion 210 is worn around the wearing object and the elastic fixing portion 210 is in the natural state.

In some embodiments, the pressure F of the bone conduction vibrator on the wearing object may be within a preset pressure range. In some embodiments, the preset pressure range may be 0.2 N-2 N. In some embodiments, the preset pressure range may be 0.3 N-1.8 N. Preferably, the preset pressure range may be 0.4 N-1.6 N. More preferably, the preset pressure range may be 0.5 N-1.5 N. The range of pressure F may be adjusted depending on different wearing objects. A preferred range of the preset pressure range may be 0.6 N-1.2 N, i.e., a minimum threshold of the preset pressure range is 0.6 N and a maximum threshold of the preset pressure range is 1.2 N. By cooperating the elastic fixing portion 210 with the fixing member 220, the elastic fixing portion 210 generates the pressure F between the minimum threshold and the maximum threshold, so as to ensure that the elastic fixing portion 210 can generate the pressure F within the threshold range. At the same time, by adjusting the elastic coefficient of the elastic fixing portion 210 and a hole spacing L between the two adjacent buckle holes 211, the magnitude of the pressure F and the variation range of the pressure F can be adjusted to provide a more accurate pressure F and improve the fixing effect of the elastic fixing portion 210.

In some embodiments, the fixing member 220 may be replaced with a pin (not shown in the figures). The pin has a columnar structure protruding relative to its main structure. The multiple buckle holes 211 may be replaced with multiple boxes (not shown in the figures) correspondingly, and the middle of the box is provided with a hole that matches the columnar body of the pin. Specifically, the hole is in a shape of a groove. The columnar body of the pin and the hole of the box cooperate to achieve the fixing of the elastic fixing portion and the fixing member. Multiple boxes are distributed on the elastic fixing portion along the length direction of the elastic fixing portion. The pin is fixed at one end of the elastic fixing portion. The fixing member and the other end of the elastic fixing portion are detachably fixed by inserting the pin into the box. By adjusting the pin to insert into the boxes at different positions, the tensioning degree of the elastic fixing portion worn around the wearing object can be adjusted, so as to realize the adjustment of the pressure of the bone conduction vibrator located between the elastic fixing portion and the wearing object acting on the wearing object. The specific positions and structures of the box and the pin are similar to the fixing assembly shown in FIG. 2 and FIG. 3 and can be referred to accordingly.

It should be known that the fixing member may also be of other structures. For example, the fixing member may be a coiled structure. By adjusting a length of the coiled elastic fixing portion, the tensioning degree of the elastic fixing portion worn around the wearing object may be adjusted. As another example, the fixing member is a buckle member with a buckle tooth. The elastic fixing portion includes multiple buckle slots disposed at intervals. By adjusting the buckle member to be fixed in different buckle slots, the tensioning degree of the elastic fixing portion worn around the wearing object may be adjusted. Fixing members with different structures may be described below with reference to FIG. 4, FIG. 5A, and FIG. 5B, respectively.

Figure 4:
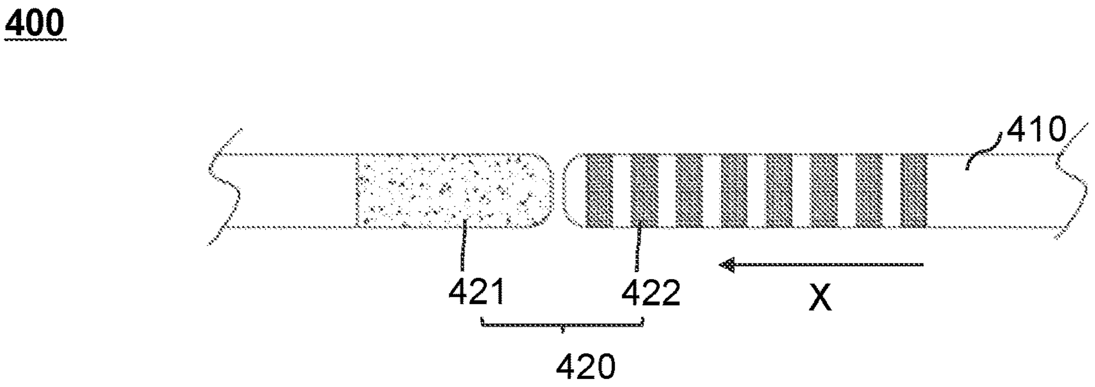
FIG. 4 is a schematic diagram illustrating a structure of a fixing assembly according to some embodiments of the present disclosure.

FIG. 4 is a schematic diagram illustrating a structure of a fixing assembly according to some embodiments of the present disclosure. As shown in FIG. 4, a fixing assembly 400 may include an elastic fixing portion 410 and a fixing member 420. The elastic fixing portion 410 is similar to the elastic fixing portion 210 shown in FIG. 2. The fixing member 420 is an adhesive buckle member. The adhesive buckle member includes a gross surface 421 and a hook surface 422. The gross surface 421 is laid and fixed to one end of the elastic fixing portion 410, and multiple hook surfaces 422 are arranged at intervals on the other end of the elastic fixing portion 410 along the length direction (X direction shown in FIG. 4) of the elastic fixing portion 410. The gross surface 421 and the hook surface(s) 422 adhere to each other to achieve the fixing of the elastic fixing portion 410 worn around the wearing object by the fixing member 420. By adjusting the gross surface 421 to adhere to the hook surface(s) 422 at different positions, the tensioning degree of the elastic fixing portion 410 worn around the wearing object can be adjusted, thereby realizing the adjustment of the pressure of the bone conduction vibrator located between the elastic fixing portion 410 and the wearing object acting on the wearing object. For more information about the first and second positions on the elastic fixing portion 410 and the specific distribution of the hook surface(s) 422, please refer to FIG. 2 and FIG. 3, and the descriptions thereof.

In some embodiments, the positions of the gross surface 421 and the hook surface(s) 422 may be interchangeable. Specifically, the hook surface 422 is laid and fixed to one end of the elastic fixing portion 410, and multiple gross surfaces 421 are arranged at intervals on the other end of the elastic fixing portion 410 along the length direction of the elastic fixing portion 410.

Figure 5A:
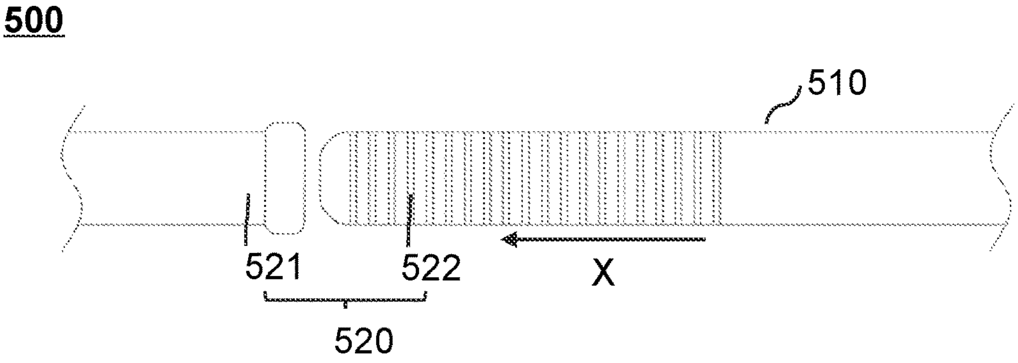
FIG. 5A is a schematic diagram illustrating a structure of a fixing assembly according to some further embodiments of the present disclosure.

FIG. 5A is a schematic diagram illustrating a structure of a fixing assembly according to some further embodiments of the present disclosure. As shown in FIG. 5A, a fixing assembly 500 may include an elastic fixing portion 510 and a fixing member 520. The elastic fixing portion 510 is similar to the elastic fixing portion 210 shown in FIG. 2, and the fixing member 520 is a ring buckle member. The ring buckle member includes a ring buckle 521. The ring buckle 521 is fixed to one end of the elastic fixing portion 510. The elastic fixing portion 510 is provided with multiple buckle slots 522 distributed at intervals along the length direction (X direction shown in FIG. 5A) of the elastic fixing portion 510. The ring buckle 521 and the buckle slot(s) 522 snap together to achieve the fixing of the elastic fixing portion 510 worn around the wearing object by the fixing member 520. By adjusting the ring buckle 521 to insert into the buckle slots 522 at different positions, the tensioning degree of the elastic fixing portion 510 worn around the wearing object can be adjusted, thereby realizing the adjustment of the pressure of the bone conduction vibrator located between the elastic fixing portion 510 and the wearing object acting on the wearing object. For more information about the first position and the second position on the elastic fixing portion 510, please refer to FIG. 2 and FIG. 3 and their related descriptions.

Figure 5B:
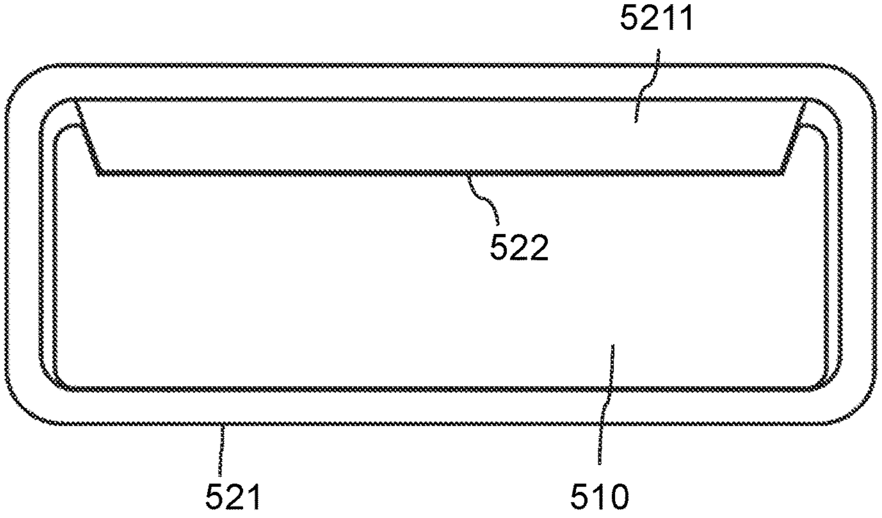
FIG. 5B is a schematic diagram illustrating cooperation of a ring buckle member according to some embodiments of the present disclosure.

FIG. 5B is a schematic diagram illustrating the cooperation of a ring buckle member according to some embodiments of the present disclosure. In some embodiments, as shown in FIG. 5B, the ring buckle 521 may be a ring-shaped structure, and an inner wall of the ring buckle 521 is provided with a convex block 5211 that fits into the buckle slot(s) 522. By cooperating the thickness of the ring buckle 521 with the thickness of the elastic fixing portion 510, the convex block 5211 included in the ring buckle 521 can be embedded in the buckle slots 522 when the end of the elastic fixing portion 510 provided with the buckle slots 522 passes through the ring buckle 521, thereby achieving the engagement of the ring buckle 521 and the buckle slots 522. By way of exemplary illustration only, by applying a force to the elastic fixing portion 510 along a direction in which the elastic fixing portion 510 towards the ring buckle 521, the convex block 5211 included in the ring buckle 521 may be detached from a previous buckle slot 522 and inserted into the adjacent next buckle slot 522 until the convex block 5211 fits into the buckle slot 522 located at an appropriate position. By applying a force to the elastic fixing portion 510 along a direction in which the elastic fixing portion 510 is away from the ring buckle 521, the convex block 5211 included in the ring buckle 521 may be detached from the multiple buckle slots 522 in sequence until the end of the elastic fixing portion 510 provided with buckle slots 522 is detached from the ring buckle 521. The thickness of the elastic fixing portion 510 is a distance between a side surface of the elastic fixing portion 510 provided with the buckle slots 522 and the correspondingly opposite side surface, and the thickness of the ring buckle 521 is a distance between an inner wall side surface of the ring buckle 521 provided with the buckle slots 522 and its opposite side surface. In some embodiments, both two inner wall side surfaces opposite to each other in the thickness direction of the ring buckle 521 are provided with the convex blocks 5211, and both side surfaces opposite to each other in the thickness direction of the elastic fixing portion 510 are provided with the buckle slots 522. When one end of the elastic fixing portion 510 provided with the buckle slots 522 passes through the ring buckle 521, the two opposite convex blocks 5211 in the ring buckle 521 may be inserted into two opposite buckle slots 522 on the elastic fixing portion 510, respectively, thereby achieving a more secure engagement of the ring buckle 521 and the buckle slots 522.

Figure 6:
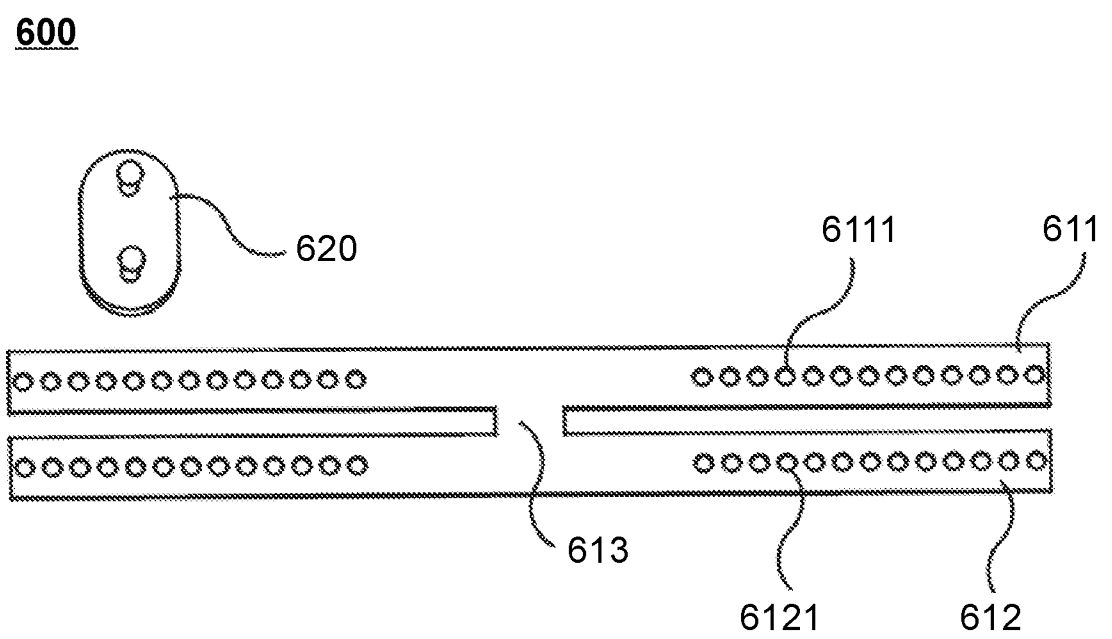
FIG. 6 is a schematic diagram illustrating a structure of a fixing assembly according to some embodiments of the present disclosure.
Figure 7:
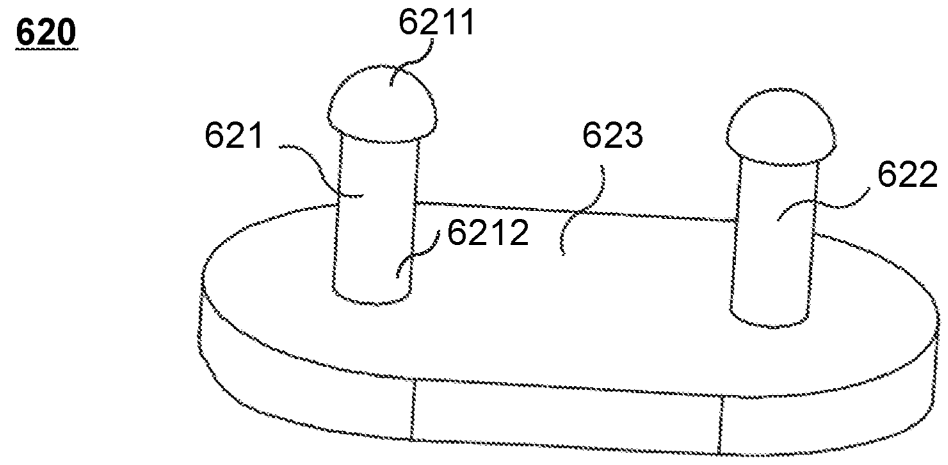
FIG. 7 is a schematic diagram illustrating a structure of a fixing member illustrated in FIG. 6.
Figure 8:
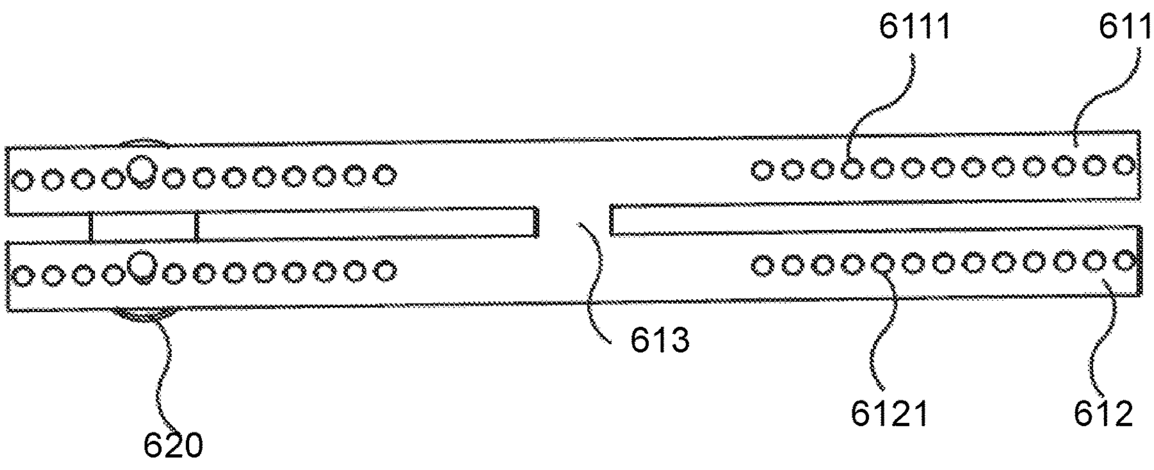
FIG. 8 is a schematic diagram illustrating the cooperation of an elastic fixing portion with a fixing member illustrated in FIG. 6.

FIG. 6 is a schematic diagram illustrating a structure of a fixing assembly according to some embodiments of the present disclosure. FIG. 7 is a schematic diagram illustrating a structure of a fixing member illustrated in FIG. 6. FIG. 8 is a schematic diagram illustrating the cooperation of an elastic fixing portion with a fixing member illustrated in FIG. 6.

As shown in FIG. 6, a fixing assembly 600 may include an elastic fixing portion, and the elastic fixing portion may include a first band body 611, a second band body 612, and a connection band body 613, wherein the first band body 611 and the second band body 612 are provided side-by-side, and the connection band body 613 is used to connect the first band body 611 and the second band body 612. Specifically, the first band body 611, the second band body 612, and the connection band body 613 are combined to form an elastically stretchable "工"-shaped belt. When the first band body 611 and the second band body 612 elastically surround the wearing object, both sides are stretched at the same distance to make the overall deformation of the first band body 611 and the second band body 612 relatively uniform.

In some embodiments, a number of connection band bodies 613 may be one or more. For example, if the number of connection band bodies 613 is one, the connection band body 613 may be provided at a central position along a length direction of the first band body 611 and the second band body 612 or at any other position. As another example, if the number of connection band bodies 613 is two, in some embodiments, the two connection band bodies 613 may be provided at the ends of the first band body 611 and the second band body 612, respectively, or at any other position that enables connection of the first band body 611 and the second band body 612.

Continually referring to FIG. 6, the connection band body 613 is provided at a central position along the length direction of the first band body 611 and the second band body 612, and the first band body 611 is provided with multiple fourth buckle holes 6111 disposed at intervals along its length direction. Specifically, the multiple fourth buckle holes 6111 are provided symmetrically at both ends of the first band body 611 with the connection band body 613 as the center, and two fourth buckle holes 6111 provided symmetrically are considered as a group. The second band body 612 is provided with multiple fifth buckle holes 6121 disposed at intervals along the length direction of the second band body 612. Specifically, the multiple fifth buckle holes 6121 are provided symmetrically at both ends of the second band body 12 with the connection band body 613 as the center, and two fifth buckle holes 6121 provided symmetrically are considered as a group. The fourth buckle hole 6111 and the fifth buckle hole 6121 disposed at intervals along an interval direction of the first band body 611 and the second band body 612 are considered as a group, i.e., a group of buckle holes includes a group of fourth buckle holes 6111 and a group of fifth buckle holes 6121, wherein the fourth buckle holes 6111 and the fifth buckle holes 6121 are disposed at intervals along the interval direction of the first band body 611 and the second band body 612.

It should be noted that the multiple fourth buckle holes 6111 may also be symmetrically disposed at both ends of the first band body 611 without taking the connection band body 613 as the center, and the multiple fifth buckle holes 6121 may also be symmetrically disposed at both ends of the second band body 12 without taking the connection band body 613 as the center. For example, one end of the first band body 611 or the second band body 612 has one group of buckle holes, and the other end of the first band body 611 or the second band body 612 have multiple groups of buckle holes.

In conjunction with FIG. 6 and FIG. 7, in some embodiments, the fixing member 620 may be a buckle member. The buckle member may include a buckle base 623 and a buckle. One end of the buckle may be connected to the buckle base 623. The buckle is adapted to each group of buckle holes on the first band body 611 and the second band body 612, for example, the multiple fourth buckle holes 6111 and the multiple fifth buckle holes 6121 are used for the buckle to be inserted, and thus adjust the magnitude of the pressure F of the elastic fixing portion. Specifically, when the buckle is inserted into the corresponding fourth hole 6111 and fifth hole 6121, it is equivalent to that the buckle is inserted into one of the buckle holes 211 as shown in FIGS. 2 and 3.

As shown in FIGS. 7 and 8, the buckle may include a first buckle 621 and a second buckle 622. The first buckle 621 and the second buckle 622 are disposed at intervals from each other along the interval direction of the first band body 611 and the second band body 612, wherein the first buckle 621 is inserted into a fourth buckle hole 6111 and the second buckle 622 is inserted into a fifth buckle hole 6121.

In some embodiments, the first buckle 621 and the second buckle 622 may include a mushroom head-shaped structure 6211 and a connection column 6212. The mushroom head-shaped structure 6211 is connected to the buckle base 623 via the connection column 6212. In some embodiments, the mushroom head-shaped structure 6211 may be a hemisphere, wherein a diameter of the hemisphere is larger than a diameter of the fourth buckle hole 6111 or the fifth buckle hole 6121. The mushroom head-shaped structure may be passed through the buckle hole by an external force, so that when the first buckle 621 and the second buckle 622 are respectively inserted into the fourth buckle hole 6111 and the fifth buckle hole 6121, the elastic fixing portion is prevented from detaching from the fixing member 620.

In some embodiments, the fixing member 620 may be fixedly provided on the bone conduction vibrator. In some embodiments, the connection portion may be a fixing material that fixes the fixing member 620 to the side of the bone conduction vibrator away from the wearing object. In some embodiments, the fixing material may be glue or any other material that achieves a fixed connection between the buckle and the bone conduction vibrator.

Figure 9:
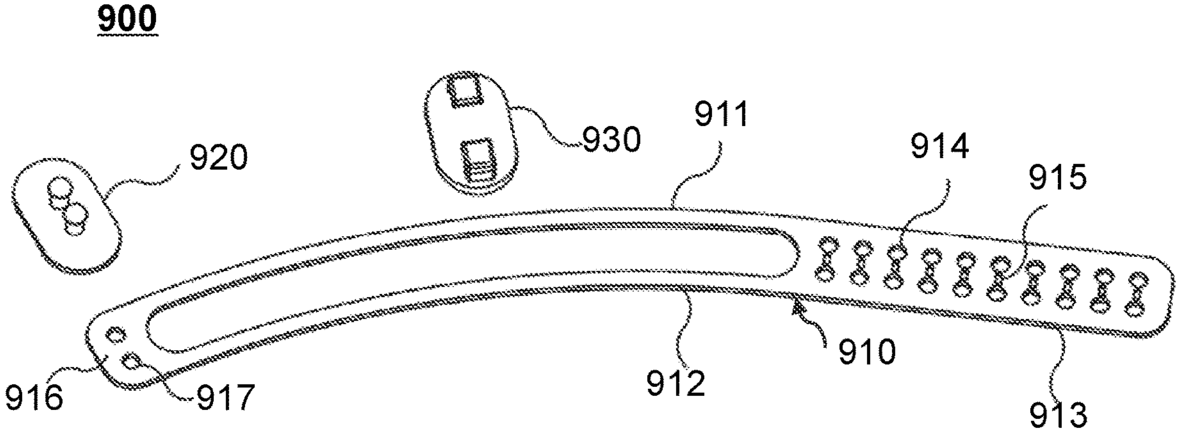
FIG. 9 is a schematic diagram illustrating a structure of a fixing assembly according to some embodiments of the present disclosure.
Figure 10:
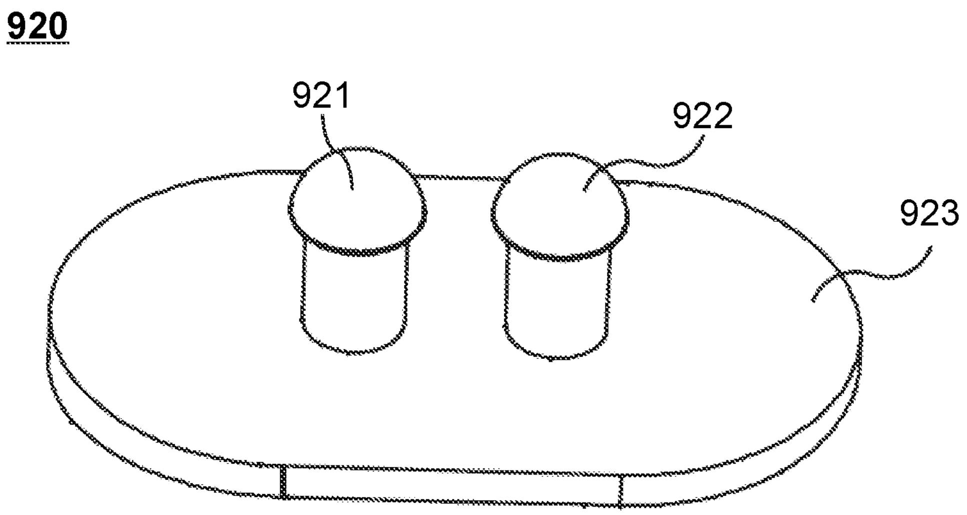
FIG. 10 is a schematic diagram illustrating a structure of the fixing member illustrated in FIG. 9.
Figure 11:
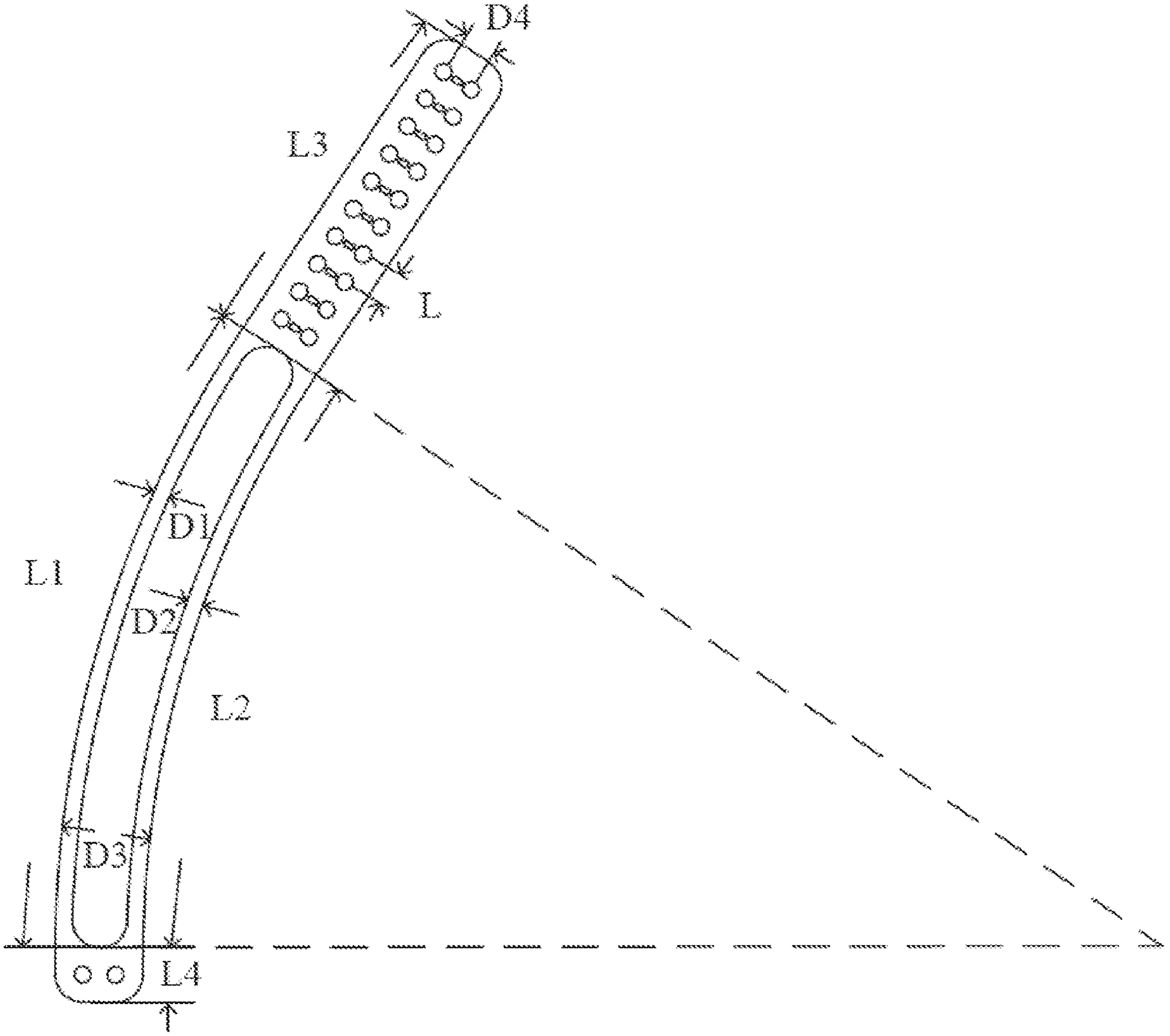
FIG. 11 is a schematic diagram illustrating a structural size of the elastic fixing portion illustrated in FIG. 9.
Figure 12:
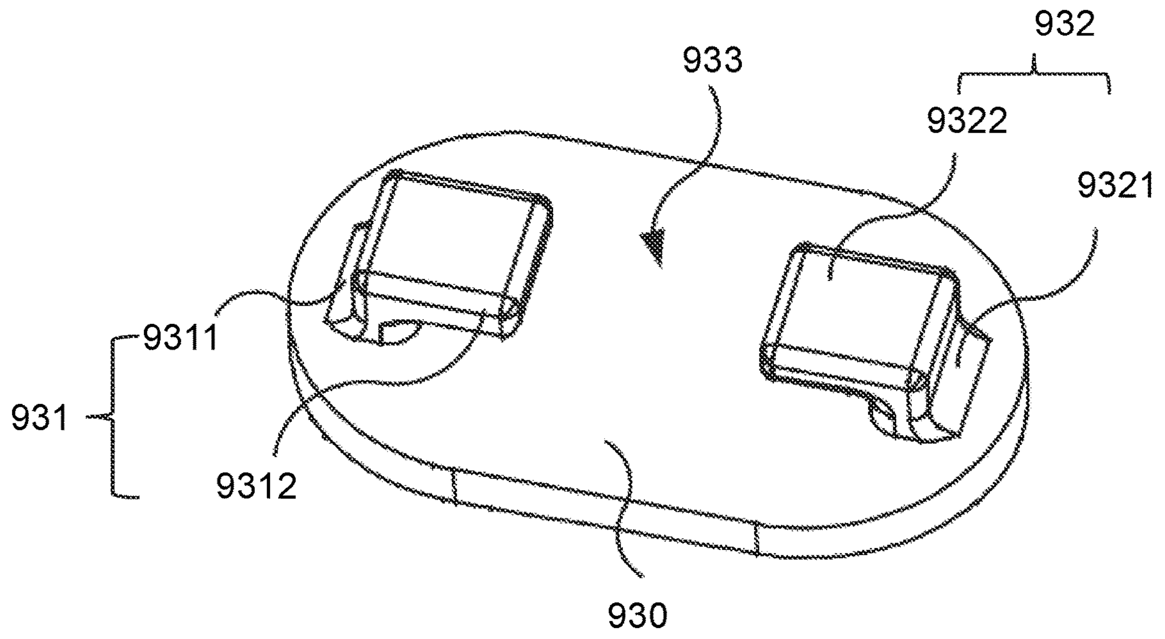
FIG. 12 is a schematic diagram illustrating a structure of the fixing base illustrated in FIG. 9.
Figure 13:
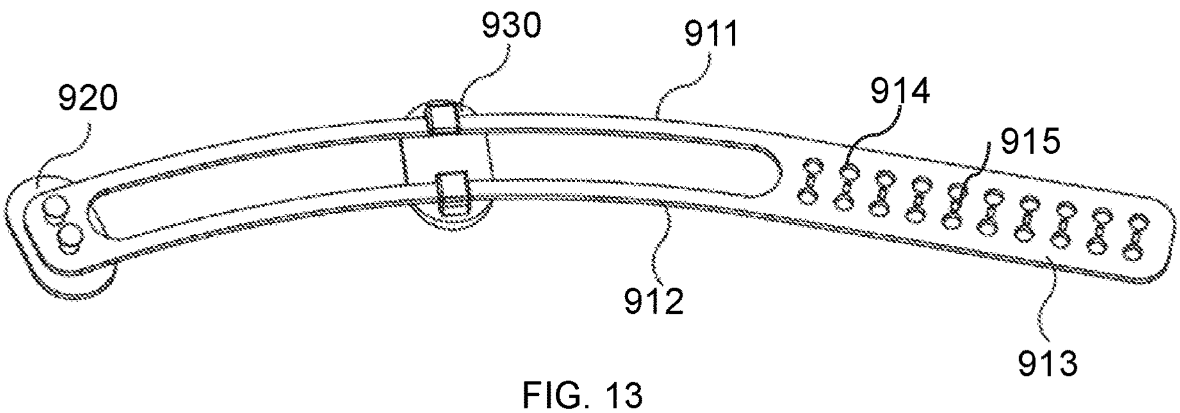
FIG. 13 is a schematic diagram illustrating structures of the elastic fixing portion, the fixing base, and the fixing member illustrated in FIG. 9.

FIG. 9 is a schematic diagram illustrating a structure of a fixing assembly according to some embodiments of the present disclosure. FIG. 10 is a schematic diagram illustrating a structure of the fixing member illustrated in FIG. 9. FIG. 11 is a schematic diagram illustrating a structural size of the elastic fixing portion illustrated in FIG. 9. FIG. 12 is a schematic diagram illustrating a structure of the fixing base illustrated in FIG. 9. FIG. 13 is a schematic diagram illustrating structures of the elastic fixing portion, the fixing base, and the fixing member illustrated in FIG. 9.

As shown in FIG. 9, in some embodiments, an elastic fixing portion 910 may include a first band body 911, a second band body 912, a third band body 913, and a fixing member 920. One end of the first band body 911 and one end of the second band body 912 are collectively connected to the third band body 913, and the other end of the first band body 911 and the other end of the second band body 912 are collectively connected to the fixing member 920. In embodiments where the fixing assembly 900 is used for bone conduction vibrator testing, a guinea pig may be used as an example of a wearing object for illustration. The first band body 911 may be used to at least partially elastically surround the head of the lab rat, and the second band body 912 is used to at least partially elastically surround the neck of the lab rat. In some embodiments, the first band body 911 is elastically surrounded around the head of the lab rat on the front side of the lab rat's ear, and the second band body 912 is elastically surrounded around the neck of the lab rat on the back side of the lab rat's ear. The connection portion (not shown in the figures) is provided on a side of the bone conduction vibrator away from the lab rat to connect to the elastic fixing portion 910 and to fix the bone conduction vibrator to the head of the lab rat. In some embodiments, the connection portion and the elastic fixing portion 910 may fix the bone conduction vibrator to any other position on the head of the lab rat. Specifically, to fix the bone conduction vibrator to the top of the lab rat's head using the elastic fixing portion 910 and the connection portion, the bone conduction vibrator with the connection portion is first set on the top of the lab rat's head, for example, in the center of the top of the lab rat's head, so that a distance from the bone conduction vibrator to the left ear of the lab rat is equal to a distance from the bone conduction vibrator to the right ear of the lab rat. Secondly, the first band body 911 of the elastic fixing portion 910 is elastically surrounded on the front side of the ear of the lab rat, and the second band body 912 of the elastic fixing portion 910 is elastically surrounded on the back side of the ear of the lab rat. By arranging the first band body 911 and the second band body 912, the lab rat's ear may be placed between the first band body 911 and the second band body 912 while the bone conduction vibrator is fixed near the ear of the lab rat, thereby preventing the lab rat's ear from interfering with the wearing of the fixing assembly 900.

In some embodiments, the third band body 913 is provided with sixth buckle holes 914 disposed at intervals along the length direction of the third band body 913. Specifically, the third band body 913 is provided with multiple groups of sixth buckle holes 914 disposed at intervals along its length direction. Each group of sixth buckle holes 914 includes at least two sixth buckle holes 914 disposed at intervals along a width direction of the third band body 913. The same group of sixth buckle holes 914 is provided with an indication mark 915 between them. In some embodiments, the indication mark 915 may be one or more of blind holes, characters, numbers, colors, etc. In some embodiments, the sixth buckle holes 914 may be triangular, square, polygonal, track-shaped, etc. The shapes of the multiple sixth buckle holes 914 may all be the same or partially the same.

As shown in FIG. 10, the fixing member 920 may be a buckle member. In some embodiments, the fixing member 920 may include a fixing base 923, a first buckle 921, and a second buckle 922. The first buckle 921 and the second buckle 922 are disposed at intervals on the fixing base 923. The first buckle 921 and the second buckle 922 may be inserted into each group of sixth buckle holes 914. The first buckle 921 and the second buckle 922 cooperate with the sixth buckle holes 914 at different positions, thus adjusting the magnitude of pressure F of the elastic fixing portion 910. For more information about the fixing member 920, please refer to the fixing member 620 shown in FIG. 7.

The buckle 921 is disposed in conjunction with the sixth buckle hole(s) 914. In some embodiments, the number of buckles 921 is two so that the buckles 921 can be correspondingly inserted into two sixth buckle holes 914 of the same group. Specifically, the way of double buckles 921 may make the overall deformation of the first band body 911 and the second band body 912 relatively uniform.

Specifically, when the buckles 921 insert into the corresponding two sixth buckle holes 914, it is equivalent to that the buckles 921 are inserted into one of the buckle holes 211 as shown in FIGS. 2 and 3.

In some embodiments, the elastic fixing portion 910 may also include a fixing connection portion 916 for connecting the other end of the first band body 911 to the other end of the second band body 912. The fixing connection portion 916 is provided with a fixing buckle hole 917 for insertion of the buckle 921.

The fixing buckle hole 917 is disposed in conjunction with the sixth buckle hole 914 and the buckle 921. In some embodiments, the number of fixing buckle holes 917 is two, and the two buckles 921 are inserted into the two fixing buckle holes 917 and the two sixth buckle holes 914, respectively.

As shown in FIGS. 9 and 11, in some embodiments, the first band body 911 and the second band body 912 may be arranged in an arc shape. An arc length of the first band body 911 is L1 and an arc length of the second band body 912 is L2, wherein the arc length L1 of the first band body 911 is greater than the arc length L2 of the second band body 912. A length of the third band body 913 is L3 and a length of the fixing connection portion 916 is L4.

In some embodiments, the arc length L1 of the first band body 911 may be 115 mm-125 mm, and the arc length L2 of the second band body 912 may be 105 mm-115 mm. A difference between the arc length L1 of the first band body 911 and the arc length L2 of the second band body 912 is 6 mm-10 mm. Preferably, the arc length L1 of the first band body 911 is 120 mm and the arc length L2 of the second band body 912 is 112 mm.

A width of the first band body 911 is D1, a width of the second band body 912 is D2, and a width of the elastic fixing portion 910 is D3. In some embodiments, the widths of the first band body 911, the second band body 912, and the elastic fixing portion 910 may affect the elasticity of their corresponding structures. For example, when the width of the first band body 911, the second band body 912, or the elastic fixing portion 910 is too small, on the one hand, its structure is soft and cannot provide sufficient clamping force for the bone conduction vibrator. On the other hand, if the width of the first band body 911, the second band body 912, or the elastic fixing portion 910 is too small, it can also lead to a lower structural strength and is prone to fracture. As another example, if the width of the first band body 911, the second band body 912, or the elastic fixing section 910 is too large, its structure is stiffer and provides too much sufficient clamping force for the bone conduction vibrator, which affects the wearing experience. Merely by way of example, in some embodiments, the width D1 of the first band body 911 may be equal to the width D2 of the second band body 912. For example, the width D1 of the first band body 911 or the width D2 of the second band body 912 may be 3 mm, and the width D3 of the elastic fixing portion 910 may be 16 mm. In some embodiments, the width D1 of the first band body 911 or the width D2 of the second band body 912, and the width D3 of the elastic fixing portion 910 are not limited to the above-mentioned values and can be adapted according to their material and the wearing object.

In the embodiment of the fixing assembly for bone conduction vibrator testing, when the guinea pig is the wearing object, the head structure of the guinea pig may be approximated as a cone-shaped structure. That is, a head circumference in front of the guinea pig's ear is significantly different from a head circumference behind the ear. If both the first band body 911 and the second band body 912 are linear band structures, this may result in one of the first band body 911 and the second band body 912 exerting too much pressure on the guinea pig's head and the other exerting too little pressure on the guinea pig's head when the guinea pig is wearing the fixing assembly. In some embodiments, the first band body 911 and the second band body 912 may be in a concentric circular arc setting, which allows the first band body 911 and the second band body 912 to have different lengths, so as to be suitable for testing experiments with the bone conduction vibrator on the guinea pig. In some embodiments, the lengths of the first band body 911 and the second band body 912 and angles of the circular arcs (the circular angles) may be determined based on the head circumference in front of the guinea pig's ear and the head circumference behind the ear. Specifically, according to the arc length L1 of the first band body 911, the arc length L2 of the second band body 912, the width D1 of the first band body 911, the width D2 of the second band body 912, and the width D3 of the elastic fixing part 910, the circular angle of the first band body 911 may be calculated according to the following equation:

$$\frac{2\pi r}{360^\circ} \times x = L1, \tag{2}$$

$$\frac{2\pi[r-(D3-D1)]}{360^\circ} \times x = L2. \tag{3}$$

According to equation (2)-equation (3), the following formula may be obtained:

$$x = \frac{(L2-L1)\times 360^\circ}{2\pi\ (D3-D1)}, \tag{4}$$

where x denotes the circular angle of the first band body 911 and r denotes a radius corresponding to the circular angle of the first band body 911. Similarly, using the above equations, the circular angle of the second band body 912 may be calculated.

In some embodiments, the circular angle of the first band body 911 may be 32 degrees-36 degrees, and an absolute value of a difference between the circular angle of the first band body 911 and the circular angle of the second band body 912 is less than 2 degrees. In some embodiments, the circular angle of the first band body 911 may be 32 degrees-35 degrees. In some embodiments, the circular angle of the first band body 911 may be 32 degrees-34 degrees. Preferably, the circular angle of the first band body 911 may be 33 degrees. In some embodiments, the absolute value of the difference between the circular angle of the first band body 911 and the circular angle of the second band body 912 is less than 1.5 degrees. In some embodiments, the absolute value of the difference between the circular angle of the first band body 911 and the circular angle of the second band body 912 is less than 1 degree. Preferably, the absolute value of the difference between the circular angle of the first band body 911 and the circular angle of the second band body 912 is less than 0.5 degrees. Further, a hole spacing between two adjacent sixth buckle holes 914 along the length direction of the third band body 913 is L, and a hole spacing between the sixth buckle holes 914 in the same group is D4. It should be noted that the wearing object is not limited to the above-mentioned guinea pig, and the wearing object or testing object may also be other individuals. When the fixing assembly is worn on other individuals, the lengths of the first band body 911 and the second band body 912 or the corresponding circular angles may be adjusted adaptively. For example, the first band body 911 and the second band body 912 may both have a linear band structure, and the two may be arranged approximately in parallel.

As shown in FIG. 12, the fixing assembly 900 may also include a fixing base 930 provided on the side of the bone conduction vibrator away from the wearing object. The fixing base 930 is further provided with a first hook member 931 and a second hook member 932 extending away from the bone conduction vibrator. In some embodiments, the fixing base 930 may be the aforementioned connection portion 130.

In some embodiments, the first hook member 931 and the second hook member 932 are disposed at intervals from each other along an interval direction of the first band body 911 and the second band body 912. One end of the first hook member 931 fixedly disposed on the fixing base 930 is a fixing end 9311 of the first hook member 931, and the end of the first hook member 931 away from the fixing base 930 extends toward the second hook member 932 to form a free end 9312 of the first hook member 931. One end of the second hook member 932 fixedly disposed on the fixing base 930 is a fixing end 9321 of the second hook member 932, and the end of the second hook member 932 away from the fixing base 930 extends toward the first hook member 931 to form a free end 9322 of the second hook member 932. An opening 933 is formed between the free end 9311 of the first hook member 931 and the free end 9322 of the second hook member 932.

Specifically, the opening 933 may be the shortest distance between the free end 9312 of the first hook member 931 and the free end 9322 of the second hook member 932. An interval distance between the fixing end 9311 of the first hook member 931 and the fixing end 9321 of the second hook member 932 is a distance between a point where the fixing end 9311 of the first hook member 931 is closest to the fixing end 9321 of the second hook member 932 and a point where the fixing end 9321 of the second hook member 932 is closest to the fixing end 9311 of the first hook member 931. The interval distance between the first band body 911 and the second band body 912 is the width D3 of the elastic fixing portion 910.

In some embodiments, the opening 933 may be smaller than the interval distance between the first band body 911 and the second band body 912 so that the elastic fixing portion 910 is not easily detached from the fixing base 930 when the first band body 911 and the second band body 912 are set between the first hook member 931 and the second hook member 932 through the opening 933.

In some embodiments, the interval distance between the fixing end 9311 of the first hook member 931 and the fixing end 9321 of the second hook member 932 is greater than the interval distance between the first band body 911 and the second band body 912.

In some embodiments, the first hook member 931 and the second hook member 932 may be fixed to the fixing base 930 via a convex table. A distance between the convex table provided with the first hook member 931 and the convex table provided with the second hook member 932 may be greater than, less than, or equal to the interval distance between the first band body 911 and the second band body 912.

As shown in FIG. 13, when the elastic fixing portion 910 is provided in cooperation with the fixing base 930, the first band body 911 and the second band body 912 are disposed in an accommodation space formed by the free end of the first hook member 931, the free end of the second hook member 932, and the fixing base 930. The first hook member 931 and the second hook member 932 are used to limit the positions of the first band body 911 and the second band body 912.

In the embodiment of the fixing assembly for bone conduction vibrator testing, a guinea pig may be used as a wearing object. The bone conduction vibrator is pressed onto the head of the guinea pig via an elastic fixing portion (e.g., the elastic fixing portion 210 shown in FIG. 2 or FIG. 3, the elastic fixing portion 410 shown in FIG. 4, the elastic fixing portion 510 shown in FIG. 5A, and the elastic fixing portions shown in FIG. 6 and FIG. 9). The bone conduction vibrator transmits an audio signal to the guinea pig. A brain signal generated by the guinea pig in response to the vibration signal transmitted by the bone conduction vibrator is detected, and the brain signal is a feedback signal from the wearing object. The signal transmission performance of the bone conduction vibrator is determined by comparing the brain signal with a preset signal intensity. As used herein, the brain signal is a test signal obtained by testing the brain of the wearing object after receiving the audio signal, the intensity of the brain signal is an amplitude of the test signal, and the preset signal intensity is a preset amplitude. When the amplitude of the test signal is greater than or equal to the preset amplitude, it can be considered that the wearing object can effectively obtain the information contained in the audio signal after receiving the audio signal.

Specifically, when the pressure F is less than the minimum threshold, the intensity of the brain signal is less than the preset signal intensity at this time; when the pressure F is equal to the minimum threshold, the intensity of the brain signal is equal to the preset signal intensity at this time; when the pressure F is between the minimum threshold and the maximum threshold, the intensity of the brain signal is greater than the preset signal intensity at this time; when the pressure F is equal to the maximum threshold, the intensity of the brain signal is equal to the preset signal intensity at this time; and when the pressure F is greater than the maximum threshold, the intensity of the brain signal is less than the preset signal intensity at this time.

Since the pressure of the bone conduction vibrator pressing against the wearing object can affect the intensity of the feedback signal of the wearing object, when the pressure of the bone conduction vibrator pressing on the wearing object is between the minimum threshold and the maximum threshold, the intensity of the detected brain signal is greater than or equal to the preset signal intensity. By fixing the fixing member fixed at one end of the elastic fixing portion to the second position on the elastic fixing portion, it can ensure that the tensioning force of the elastic fixing portion is within the threshold range (between the minimum threshold and the maximum threshold), so as to avoid the problem that the intensity of the feedback signal is not high due to the pressure of the bone conduction vibrator on the wearing object is too small or too large.

In some embodiments, the fixing assembly may be used in a bone conduction earphone (e.g., a headband bone conduction earphone). For example, the fixing member fixes the elastic fixing portion around the human head. An acoustic output unit of the bone conduction earphone is always pressed near the human ear (e.g., front, back, upper, or lower side of the auricle, etc.) by the elastic fixing portion. The audio signal output by the acoustic output unit of the bone conduction earphone is transmitted to the human body through the bones, muscle tissues, blood, etc., and is perceived by the auditory nerves of the human body. In some embodiments, a connection position between the fixing member and the elastic fixing portion may be adjusted according to the human body's wearing feeling, so as to adjust the tensioning degree of the elastic fixing portion and make the wearing experience more comfortable. The fixing assembly may make the bone conduction earphone adapt to different users. While enhancing wearing comfort, by adjusting the tensioning degree of the elastic fixing portion, the pressure of the bone conduction earphone on different human bodies can be within the preset pressure range, so as to avoid the pressure of the bone conduction earphone on the human body is too small, resulting in a poor audio signal received by the human body, or the pressure of the bone conduction earphone on the human body is too large, resulting in the unsuitable wearing of the bone conduction earphone. It should be noted that different users who wear the bone conduction earphone may have different threshold ranges and preset ranges of the tensioning force, which can be determined according to the actual needs.

In some embodiments, the fixing assembly may also be applied to the wearing of a watch or pedometer. For example, the fixing member fixes the elastic fixing portion around a wrist of the human body. In some embodiments, the connection position between the fixing member and the elastic fixing portion may be adjusted according to the feeling of the human body wearing the watch or pedometer, so that the tensioning degree of the elastic fixing portion can be adjusted to make the watch or pedometer more suitable for wearing, and the fixing assembly can adapt the watch or pedometer to different human bodies. In some embodiments, the fixing assembly may also be used for the wearing of an oximeter or blood pressure monitor. The fixing member fixes the elastic fixing portion around to a human wrist or large arm so that the oximeter or blood pressure monitor can always be pressed against the human skin under the action of the elastic fixing portion during human activity to obtain a blood oxygen content or blood pressure under the skin of the human body. In some embodiments, according to the human body's wearing experience, the connection position between the fixing member and the elastic fixing portion may be properly adjusted, thereby adjusting the tensioning degree of the elastic fixing portion and making the wearing experience more comfortable.

The present disclosure also provides a wearing device, and the wearing device may include a fixing assembly and a bone conduction vibrator. In some embodiments, the fixing assembly may include an elastic fixing portion and a fixing member. The elastic fixing portion is a band structure. The elastic fixing portion includes a first position and a second position. The first position and the second position are disposed at intervals along a length direction of the elastic fixing portion. The fixing member fixes the elastic fixing portion around the wearing object so that the bone conduction vibrator is disposed between the elastic fixing portion and the wearing object. When the elastic fixing portion surrounds the wearing object and is in a natural state, the fixing member fits into the first position of the elastic fixing portion. When the fixing member fits into the second position, the elastic fixing portion provides a pressure for the bone conduction vibrator to act on the wearing object, and the pressure is within a preset pressure range. It should be noted that the fixing assembly of the wearing device may be similar to the fixing assembly 200, the fixing assembly 400, the fixing assembly 500, the fixing assembly 600, or the fixing assembly 900 and is not repeated herein. The wearing device is described below in connection with the fixing assembly of FIG. 14.

Figure 14:
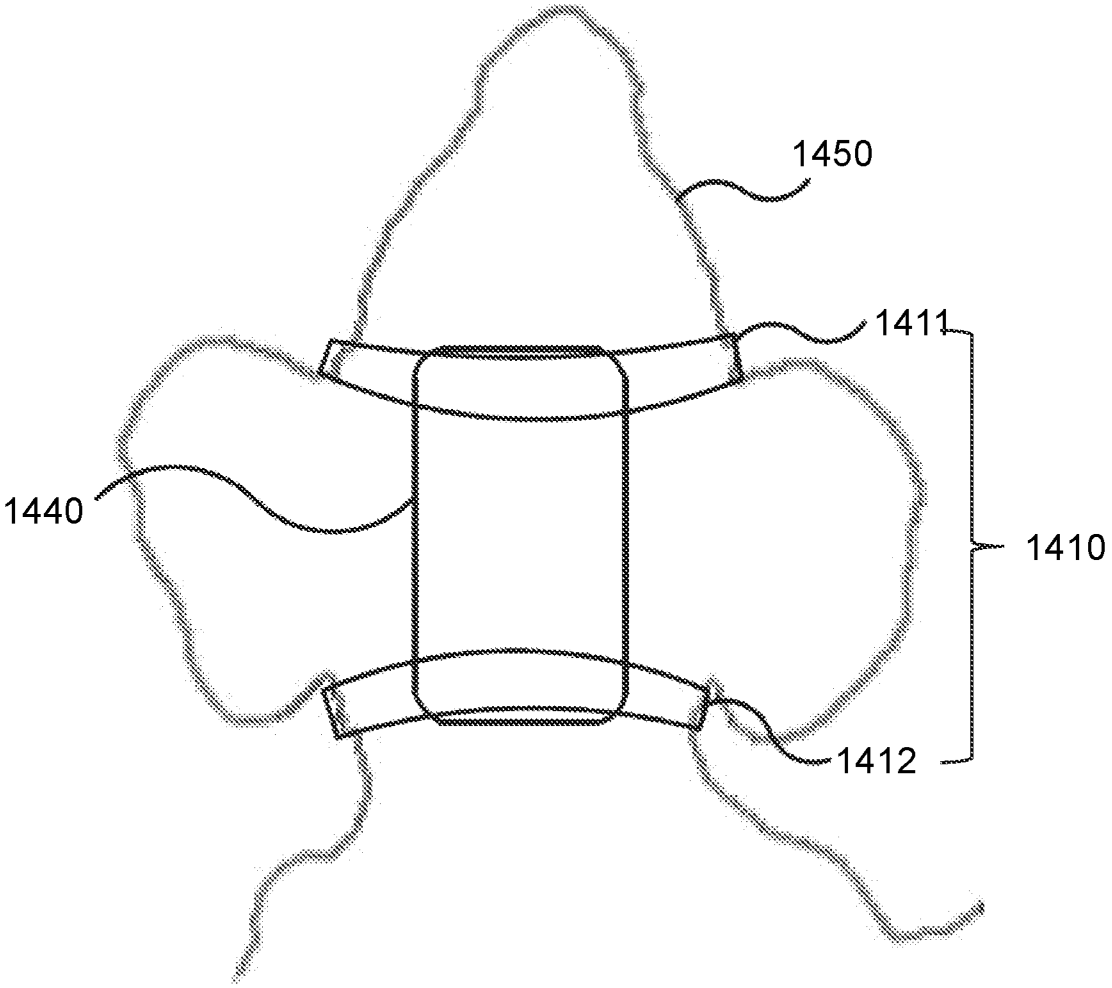
FIG. 14 is a schematic diagram illustrating a structure of a wearing device according to some embodiments of the present disclosure.

FIG. 14 is a schematic diagram illustrating a structure of a wearing device according to some embodiments of the present disclosure. As shown in FIG. 14, a wearing device 1400 may include a fixing assembly and a bone conduction vibrator 1440. The fixing assembly is used to fix the bone conduction vibrator 1440 to a wearing object 1450. The fixing assembly is the fixing assembly 600 or the fixing assembly 900 as disclosed in the above embodiments and is not repeated. A lab rat is the wearing object 1450. The wearing device 1400 fixes the bone conduction vibrator 1440 to the head of the lab rat via the fixing assembly to achieve the bone conduction vibrator testing on the lab rat.

In some embodiments, the fixing assembly includes an elastic fixing portion 1410 and a connection portion. The elastic fixing portion 1410 includes a first band body 1411 and a second band body 1412. The first band body 1411 is used to elastically surround at least a portion of the head of the lab rat, and the second band body 1412 is used to elastically surround at least a portion of the neck of the lab rat. In some embodiments, the first band body 1411 is elastically surrounded around the head of the lab rat on the front side of the lab rat's ear, and the second band body 1412 is elastically surrounded around the neck of the lab rat on the back side of the lab rat's ear. The connection portion (not shown in the figures) is provided on the side of the bone conduction vibrator away from the lab rat for connecting to the elastic fixing portion 1410 and fixing the bone conduction vibrator to the head of the lab rat. In some embodiments, the connection portion and the elastic fixing portion 1410 may fix the bone conduction vibrator to any other position on the head of the lab rat.

Specifically, to fix the bone conduction vibrator to the top of the lab rat's head using the elastic fixing portion 1410 and the connection portion, the bone conduction vibrator with the connection portion is first set on the top of the lab rat's head, for example, in the center of the top of the lab rat's head, so that a distance from the bone conduction vibrator to the left ear of the lab rat is equal to a distance from the bone conduction vibrator to the right ear of the lab rat. Secondly, the first band body 1411 of the elastic fixing portion 1410 is elastically surrounded on the front side of the ear of the lab rat, and the second band body 1412 of the elastic fixing portion 1410 is elastically surrounded on the back side of the ear of the lab rat. The first band body 1411 and the second band body 1412 are arranged in cooperation with the connection portion, so as to fix the bone conduction vibrator on the top head of the lab rat.

In some embodiments, the elastic fixing portion 1410 may further include a connection band body (refer to the connection band body 613 in FIG. 6). The connection band body connects the first band body 1411 and the second band body 1412 on the jaw side of the lab rat, so that when the first band body 1411 and the second band body 1412 are stretched along the left and right ear of the lab rat and elastically around the head and neck of the lab rat, stretching distances on both sides are the same, resulting in that the first band body 1411 and the second band body 1412 are deformed relatively uniformly overall.

In some embodiments, the fixing assembly may further include a fixing member. The fixing member is provided on a side of the bone conduction vibrator away from the head of the lab rat. In some embodiments, the fixing member is further provided with a buckle that extends away from the bone conduction vibrator. The first band body 1411 is provided with multiple first buckle holes disposed at intervals along the length direction of the first band body 1411. The second band body 1412 is provided with multiple second buckle holes disposed at intervals along the length direction of the second band body 1412. The multiple first buckle holes and the multiple second buckle holes are available for insertion of the buckle, thereby adjusting clamping forces of the first band body 1411 and the second band body 1412. In some embodiments, the buckle includes a first buckle and a second buckle disposed at intervals from each other along an interval direction of the first band body 1411 and the second band body 1412, wherein the first buckle is inserted into the first buckle hole and the second buckle is inserted into the second buckle hole.

Specifically, the steps of using the elastic fixing portion 1410 in conjunction with the fixing member are as follows: firstly, setting the fixing member in the center of the head of the lab rat so that a distance from the bone conduction vibrator to the left ear is equal to a distance from the bone conduction vibrator to the right ear; secondly, setting the connection band body against the lower jaw of the lab rat; thirdly, elastically stretching the first band body 1411 at any side along the front side of the ear of the lab rat until the first buckle is inserted into any first buckle hole on the first band body 1411; fourthly, elastically stretching the first band body 1411 at the other side along the front side of the ear of the lab rat until the first buckle is inserted into another first buckle hole in the same group as the first buckle hole in the third step above; fifthly, repeating the third and fourth steps so that the second buckle is inserted into the second buckle hole in the same group as the first buckle hole in the third step, thereby fixing the bone conduction vibrator to the top of the lab rat's head.

In some embodiments, the elastic fixing portion 1410 further includes a third band body (refer to the third band body 913 in FIG. 9). One end of the first band body 1411 and one end of the second band body 1412 are jointly connected to the third band body. The other end of the first band body 1411 and the other end of the second band body 1412 are jointly connected for fixing. In some embodiments, the elastic fixing portion further includes a fixing connection portion (refer to the fixing connection portion 916 in FIG. 10) for connecting the other end of the first band body 1411 to the other end of the second band body 1412. The fixing connection portion is provided with a fixing buckle hole, and the fixing buckle hole is provided for the buckle to insert. In some embodiments, the fixing assembly may further include a fixing base (refer to the fixing base 930 in FIG. 9). The fixing base is further provided with a first hook member and a second hook member extending away from the bone conduction vibrator. The first hook member and the second hook member are disposed at intervals from each other along the interval direction of the first band body 1411 and the second band body 1412. One end of the first hook member fixedly disposed on the fixing base is a fixing end of the first hook member, and the end of the first hook member away from the fixing base extends toward the second hook member to form a free end of the first hook member. One end of the second hook member fixedly disposed on the fixing base is a fixing end of the second hook member, and the end of the second hook member away from the fixing base extends toward the first hook member to form a free end of the second hook member. An opening is formed between the free end of the first hook member and the free end of the second hook member.

Specifically, the fixing base is disposed at the side of the bone conduction vibrator away from the head of the lab rat, and the fixing member is disposed at the jaw side of the lab rat. The first band body 1411 and the second band body 1412 are disposed around the front of the ear and the back of the ear of the lab rat, respectively, and the third band body and the fixing connection portion are fixedly disposed at the jaw side of the lab rat by the fixing member.

The steps of using the elastic fixing portion in conjunction with the fixing member are as follows: firstly, setting the fixing member in the center of the head of the lab rat so that a distance from the bone conduction vibrator to the left ear is equal to a distance from the bone conduction vibrator to the right ear; secondly, disposing the central part of the first band body 1411 and the second band body 1412 in an accommodation space formed by the free end of the first hook member, the free end of the second hook member, and the fixing base, and disposing the first band body 1411 and the second band body 1412 around the front of the ear and the back of the ear of the lab rat, respectively; thirdly, stretching the third band body and the fixing connection portion to the lower jaw side of the lab rat, and inserting the buckle on the fixing member into a group of buckle holes and the fixing buckle hole, thereby fixing the bone conduction vibrator to the top of the lab rat's head. In this embodiment, the order of inserting the buckle into the buckle holes and the fixing buckle hole is not limited. It can be inserted into the buckle holes first and then into the fixing buckle hole, or inserted into the fixing buckle hole first and then into the buckle holes.

It should be noted that the above description of the fixing assembly for the bone conduction vibrator is exemplary only and does not limit the present disclosure to the scope of the embodiments cited.

It should be noted that different embodiments may produce different beneficial effects, and in different embodiments, the possible beneficial effects may be any one or a combination of the above, or any other beneficial effect that may be obtained.

The basic concepts have been described above, apparently, in detail, as will be described above and do not constitute limitations of the disclosure. Although there is no clear explanation here, those skilled in the art may make various modifications, improvements, and modifications of the present disclosure. This type of modification, improvement, and corrections are recommended in the present disclosure, so the modification, improvement, and the amendment remain in the spirit and scope of the exemplary embodiment of the present disclosure.

At the same time, the present disclosure uses specific words to describe the embodiments of the present disclosure. As "one embodiment," "an embodiment," and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of the present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately," "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A fixing assembly of a bone conduction vibrator, comprising:

an elastic fixing portion, the elastic fixing portion being in a form of a band structure, the elastic fixing portion including a first position and a second position, the first position and the second position being disposed at intervals along a length direction of the elastic fixing portion; and a fixing member, configured to fix the elastic fixing portion around a wearing object, so that the bone conduction vibrator is located between the elastic fixing portion and the wearing object;

wherein when the elastic fixing portion surrounds the wearing object and is in a natural state, the fixing member fits into the first position of the elastic fixing portion; when the fixing member fits into the second position, the elastic fixing portion provides the bone conduction vibrator with a pressure acting on the wearing object, and the pressure is within a preset pressure range.

2. The fixing assembly of claim 1, wherein a product of a distance between the first position and the second position and an elastic coefficient of the elastic fixing portion is within the preset pressure range, the preset pressure range being 0.2 N-2 N.

3. The fixing assembly of claim 1, wherein the elastic fixing portion is provided with multiple buckle holes disposed at intervals along the length direction thereof, the multiple buckle holes including at least one fixing buckle hole, the fixing buckle hole being located at the second position; the fixing member being a buckle member, the buckle member including a buckle, the buckle being inserted into the buckle hole so that the elastic fixing portion surrounds the wearing object.

4. The fixing assembly of claim 3, wherein the multiple buckle holes are equally arranged along the length direction on the elastic fixing portion; the first position is located between two adjacent buckle holes, the fixing buckle hole is an m-th buckle hole from the first position, and when the buckle is inserted into the fixing buckle hole, the pressure is $F_0\times(x_1/x_2+m-1)$, wherein $F_0\times(x_1/x_2+m-1)$ is within the preset pressure range, $x_1$ denotes a distance between the first position and the 1st buckle hole at a side of the elastic fixing portion away from the fixing member relative to the first position, $x_2$ denotes a distance between two adjacent buckle holes, and $F_0$ denotes a tensioning force of the elastic fixing portion when a deformation of the elastic fixing portion is equal to a distance between two adjacent buckle holes.

5. The fixing assembly of claim 3, wherein the multiple buckle holes are equally arranged along the length direction on the elastic fixing portion; the first position is located at a position of one of the multiple buckle holes, the fixing buckle hole is an m-th buckle hole on a side away from the fixing member relative to the first position in an extension direction of the elastic fixing portion, and when the buckle is inserted into the fixing buckle hole, the pressure is $m\times F_0$, wherein $m\times F_0$ is within the preset pressure range and $F_0$ denotes a tensioning force of the elastic fixing portion when a deformation of the elastic fixing portion is equal to a distance between two adjacent buckle holes.

6. The fixing assembly of claim 4, wherein $F_0$ is less than or equal to a maximum threshold of the preset pressure range.

7. The fixing assembly of claim 1, wherein the elastic fixing portion includes a first band body and a second band body, wherein the first band body is used to at least partially elastically surround a head of the wearing object and the second band body is used to at least partially elastically surround a neck of the wearing object; wherein the fixing member is connected to the elastic fixing portion and fixes the bone conduction vibrator to the head of the wearing object.

8. The fixing assembly of claim 7, wherein the first band body and the second band body are provided side by side, the elastic fixing portion further includes a connection portion, and the connection portion is used to connect the first band body and the second band body, wherein the connection portion is located in a central region along a length direction of the first band body or the second band body.

9. The fixing assembly of claim 8, wherein the fixing member is provided on a side of the bone conduction vibrator away from the head of the wearing object, the fixing member is provided with a buckle column extending away from the bone conduction vibrator, and the first band body and the second band body are respectively provided with multiple first buckle holes and multiple second buckle holes disposed at intervals along their respective length directions for insertion of the buckle column.

10. The fixing assembly of claim 9, wherein the multiple first buckle holes are symmetrically arranged on the first band body with the connection portion as the center, and the multiple second buckle holes are symmetrically arranged on the second band body with the connection portion as the center.

11. The fixing assembly of claim 9, wherein the buckle column includes a first buckle column and a second buckle column disposed at intervals from each other along an interval direction of the first band body and the second band body, wherein the first buckle column is inserted into the first buckle hole and the second buckle column is inserted into the second buckle hole.

12. The fixing assembly of claim 7, wherein the fixing member includes a buckle member, the elastic fixing portion includes a third band body, one end of the first band body and one end of the second band body being jointly connected to the third band body, the other end of the first band body and the other end of the second band body being jointly connected to the buckle member, the buckle member being further provided with a buckle column, the third band body being provided with a plurality of buckle holes disposed at intervals along a length direction thereof for insertion of the buckle column.

13. The fixing assembly of claim 12, wherein the fixing member is provided on a side of the bone conduction vibrator away from the head of the wearing object, the fixing member is provided with a first hook member and a second hook member extending away from the bone conduction vibrator, wherein the first hook member and the second hook member are disposed at intervals from each other in an interval direction of the first band body and the second band body, one end of the first hook member away from the fixing member extends toward the second hook member to form a free end of the first hook member, one end of the second hook member away from the fixing member extends toward the first hook member to form a free end of the second hook member, an opening is formed between the free end of the first hook member and the free end of the second hook member, and a size of the opening is less than a distance between the first band body and the second band.

14. The fixing assembly of claim 12, wherein the elastic fixing portion includes a fixing connection portion, the fixing connection portion being connected to ends of the first band body and the second band body away from the third band body, the fixing connection portion including a fixing buckle hole, the buckle column of the buckle member being matched with the fixing buckle hole and the plurality of buckle holes.

15. The fixing assembly of claim 12, wherein the first band body and the second band body are provided in an arc, and an arc length of the first band body is longer than an arc length of the second band body.

16. The fixing assembly of claim 15, wherein the first band body and the second band body are set in concentric circular arcs.

17. The fixing assembly of claim 1, wherein the bone conduction vibrator outputs an audio signal to the wearing object and the wearing object detects feedback signals with different intensities; and the pressure is within the preset pressure range and an intensity of any one of the feedback signals is greater than or equal to a preset signal intensity.

18. The fixing assembly of claim 1, wherein the fixing assembly further includes a connection portion, the connection portion being provided on the bone conduction vibrator for connecting the bone conduction vibrator and the fixing assembly.

19. The fixing assembly of claim 1, wherein the bone conduction vibrator includes a contact surface in direct contact with the wearing object, the pressure acting on the wearing object through the contact surface.

20. A wearing device comprising a fixing assembly and a bone conduction vibrator, the fixing assembly being used to fix the bone conduction vibrator to a wearing object, the fixing assembly comprising:

an elastic fixing portion, the elastic fixing portion being in a form of a band structure, the elastic fixing portion including a first position and a second position, the first position and the second position being disposed at intervals along a length direction of the elastic fixing portion; and a fixing member, configured to fix the elastic fixing portion around a wearing object, so that the bone conduction vibrator is located between the elastic fixing portion and the wearing object;

wherein when the elastic fixing portion surrounds the wearing object and is in a natural state, the fixing member fits into the first position of the elastic fixing section; when the fixing member fits into the second position, the elastic fixing portion provides the bone conduction vibrator with a pressure acting on the wearing object, and the pressure is within a preset pressure range.

* * * * *